(12) United States Patent
Aotsu et al.

(10) Patent No.: US 12,522,580 B2
(45) Date of Patent: *Jan. 13, 2026

(54) FLUORINE-CONTAINING PYRIMIDINE COMPOUNDS, HARMFUL FUNGUS CONTROL AGENT, AND METHOD FOR PRODUCING FLUORINE-CONTAINING PYRIMIDINE COMPOUNDS

(71) Applicant: UNIMATEC CO., LTD., Tokyo (JP)

(72) Inventors: Rie Aotsu, Ibaraki (JP); Junya Seino, Ibaraki (JP); Keisuke Kokin, Ibaraki (JP)

(73) Assignee: UNIMATEC CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/709,340

(22) PCT Filed: Oct. 31, 2022

(86) PCT No.: PCT/JP2022/040603
§ 371 (c)(1),
(2) Date: Dec. 2, 2024

(87) PCT Pub. No.: WO2023/085142
PCT Pub. Date: May 19, 2023

(65) Prior Publication Data
US 2025/0109117 A1    Apr. 3, 2025

(30) Foreign Application Priority Data

Nov. 12, 2021  (JP) .................. 2021-184914

(51) Int. Cl.
C07D 401/04    (2006.01)
A01N 43/54     (2006.01)
A01P 3/00      (2006.01)

(52) U.S. Cl.
CPC .......... *C07D 401/04* (2013.01); *A01N 43/54* (2013.01); *A01P 3/00* (2021.08)

(58) Field of Classification Search
CPC .............................. C07D 401/04; A01N 43/54
See application file for complete search history.

(56) References Cited

U.S. PATENT DOCUMENTS 5,250,530 A    10/1993  Giencke et al.
6,525,001 B1    2/2003  Koether et al.
(Continued)

FOREIGN PATENT DOCUMENTS

EP    3 892 617 A1    10/2021
JP    H07-118235 A    5/1995
(Continued)

OTHER PUBLICATIONS

Kishor et al., "Identification, Biochemical and Structural Evaluation of Species-Specific Inhibitors against Type 1 Methionine Aminopeptidases", Journal of Medicial Chemistry, vol. 56, No. 13, 2013, pp. 5295-5305.
(Continued)

*Primary Examiner* — Valerie Rodriguez-Garcia
(74) *Attorney, Agent, or Firm* — GREENBLUM & BERNSTEIN, P.L.C.

(57) ABSTRACT

A fluorine-containing pyrimidine compound represented by formula (1), (2) or (3):

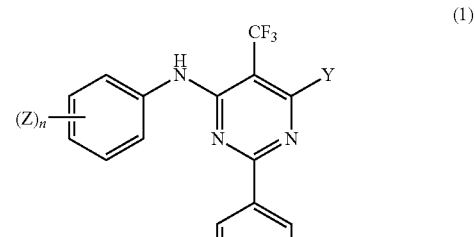

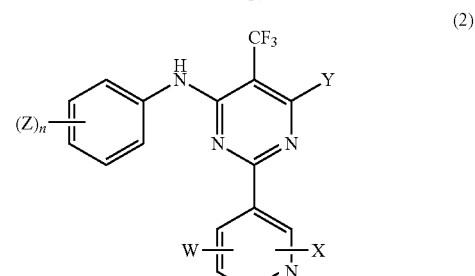

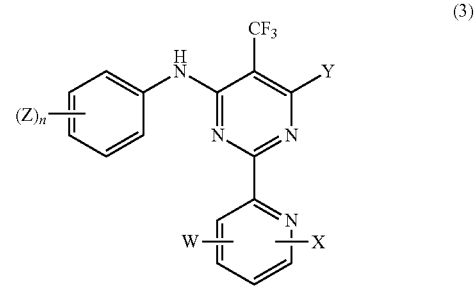

wherein W and X each independently represents a hydrogen atom, a halogen atom, a hydrocarbon group having 1 to 10 carbon atoms, $-C_mF_{2m+1}$, a nitro group, $-OA^1$, $-SO_iA^1$, $-SA^1$, $-NA^1A^2$, $-B(OA^1)(OA^2)$, $-COA^1$, $-COOA^1$ or $-CONA^1A^2$; Y represents a halogen atom or $-OA^3$; Z represents a halogen atom, a hydrocarbon group having 1 to 10 carbon atoms, $-C_mF_{2m+1}$, a nitro group, $-OA^1$, $-SO_iA^1$, $-SA^1$ or $-NA^1A^2$; $A^1$ and $A^2$ each independently represents a hydrogen atom or a hydrocarbon group having 1 to 10 carbon atoms; $A^3$ represents a hydrocarbon
(Continued)

group having 1 to 12 carbon atoms; m represents in integer of 1 to 10; l represents an integer of 1 to 3; and n represents an integer of 0 to 3.

4 Claims, No Drawings

(56) References Cited

U.S. PATENT DOCUMENTS

| | | |
|---|---|---|
| 2003/0069239 A1 | 4/2003 | Cai et al. |
| 2004/0033896 A1 | 2/2004 | Koether et al. |
| 2004/0097503 A1 | 5/2004 | Cai et al. |
| 2008/0146570 A1 | 6/2008 | Aquila et al. |
| 2009/0275590 A1 | 11/2009 | Guzzo et al. |
| 2010/0144760 A1 | 6/2010 | Varo et al. |
| 2014/0206696 A1 | 7/2014 | Guzzo et al. |
| 2014/0221366 A1 | 8/2014 | Heinrich et al. |
| 2016/0157489 A1 | 6/2016 | Shioda et al. |
| 2016/0159798 A1 | 6/2016 | Guzzo et al. |
| 2016/0257641 A1 | 9/2016 | Kobayashi et al. |
| 2017/0204095 A1 | 7/2017 | Guzzo et al. |
| 2017/0267672 A1 | 9/2017 | Stoller et al. |
| 2020/0199109 A1 | 6/2020 | Skucas et al. |

FOREIGN PATENT DOCUMENTS

| | | |
|---|---|---|
| JP | 2008-528473 A | 7/2008 |
| JP | 2020-532549 A | 11/2020 |
| WO | 1999/028301 A1 | 6/1999 |
| WO | 2009/089482 A1 | 7/2009 |
| WO | 2010/063663 A1 | 6/2010 |
| WO | 2013/004332 A1 | 1/2013 |
| WO | 2015/016372 A1 | 2/2015 |
| WO | 2015/056782 A1 | 4/2015 |
| WO | 2016/030229 A1 | 3/2016 |
| WO | 2021/235420 A1 | 11/2021 |

OTHER PUBLICATIONS

ISR issued in International Patent Application No. PCT/JP2022/040603, Jan. 17, 2023, translation.
Written Opinion issued in Int'l Patent Application No. PCT/JP2022/040603, Jan. 17, 2023, translation (IPRP).
IPRP issued in International Patent Application No. PCT/JP2022/040603, May 2, 2024, translation.
Office Action issued in Japanese Patent Application No. 2023-559566, Dec. 4, 2024, translation.
EESR issued in EP Patent Application No. 22892641.6, Oct. 7, 2025.

FLUORINE-CONTAINING PYRIMIDINE COMPOUNDS, HARMFUL FUNGUS CONTROL AGENT, AND METHOD FOR PRODUCING FLUORINE-CONTAINING PYRIMIDINE COMPOUNDS

CROSS REFERENCE TO RELATED APPLICATIONS

The present application claims the benefit of foreign priority to Japanese Patent Application No. 2021-184914, filed on Nov. 12, 2021.

BACKGROUND

Technical Field

The present disclosure relates to a fluorine-containing pyrimidine compound, a harmful fungus control agent, and a method for producing a fluorine-containing pyrimidine compound.

Description of the Related Art

It has been reported that fluorine-containing pyrimidine compounds have various biological activities. In particular, compounds having a pyridine ring at the 2-position of the pyrimidine ring and a trifluoromethyl group at the 5-position are expected to be used in the fields of medicine and agricultural chemicals.

More specifically, in International Publication Nos. WO 2009/089482 and WO 2015/056782, it is reported that 2-(4-pyridyl)-5-trifluoromethylpyrimidine derivatives have human melanin-concentrating hormone inhibitory activity and acetyl CoA carboxylase 2 inhibitory activity. In International Publication Nos. WO 2015/016372, WO 2010/063663, WO 2013/004332 and WO 2016/030229, it is reported that 2-(3-pyridyl)-5-trifluoromethylpyrimidine derivatives have fungicidal activity, insecticidal activity, orexin receptor inhibitory activity, focal adhesion kinase inhibitory activity and acetyl CoA carboxylase 2 inhibitory activity. In International Publication Nos. WO 2015/016372 and 1999/028301, it is reported that 2-(2-pyridyl)-5-trifluoromethylpyrimidine derivatives have fungicidal, insecticidal and herbicidal activities.

Further, it has been reported that pyridylpyrimidine derivatives have fungicidal activity. For example, in Japanese Patent Application Publication No. H7-118235, it is reported that pyridylpyrimidine derivatives having various substituents exhibit preventive or therapeutic control effects against many plant diseases such as rice blast, wheat eye spot, and apple scab.

SUMMARY

Production of a fluorine-containing pyrimidine compound having a fluorine-containing substituent at the 5-position of the pyrimidine ring, a heterocyclic substituent at the 2-position, and further substituents at the 4- and 6-positions is difficult in terms of reactivity and selectivity, and such a fluorine-containing pyrimidine compound has not been reported until now. Such fluorine-containing pyrimidine compounds may have useful biological activities.

The present disclosure relates to a novel fluorine-containing pyrimidine compound and a method for producing the same.

The present disclosure relates to the following embodiments.

[1] A fluorine-containing pyrimidine compound represented by the following general formula (1), (2) or (3):

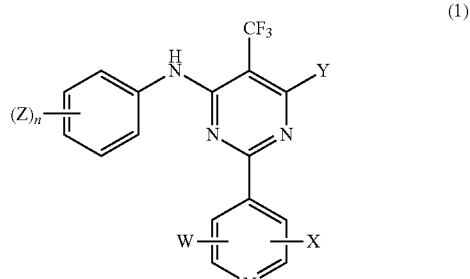

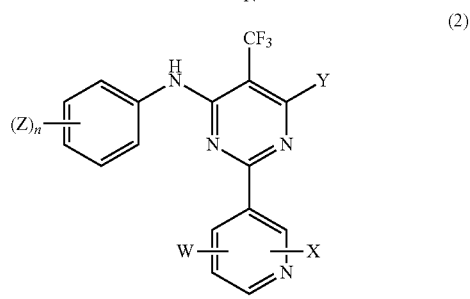

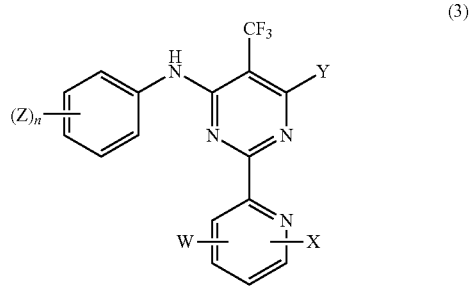

wherein in the general formulas (1) to (3), W and X each independently represent a hydrogen atom, a halogen atom, a hydrocarbon group having 1 to 10 carbon atoms, $-C_mF_{2m+1}$ (m is an integer of 1 to 10), a nitro group, $-OA^1$, $-SO_lA^1$ (l is an integer from 1 to 3), $-SA^1$, $-NA^1A^2$, $-B(OA^1)(OA^2)$, $-COA^1$, $-COOA^1$ or $-CONA^1A^2$;

Y represents a halogen atom or $-OA^3$;

Z represents a halogen atom, a hydrocarbon group having 1 to 10 carbon atoms, $-C_mF_{2m+1}$ (m is an integer of 1 to 10), a nitro group, $-OA^1$, $-SO_lA^1$ (l is an integer of 1 to 3), $-SA^1$ or $-NA^1A^2$;

$A^1$ and $A^2$ each independently represent a hydrogen atom or a hydrocarbon group having 1 to 10 carbon atoms;

$A^3$ represents a hydrocarbon group having 1 to 12 carbon atoms;

n represents an integer of 0 to 3;

$A^1$, $A^2$, m and l each may be the same or different in W, X and Z; and when a plurality of Z is present, they may be the same or different.

[2] A harmful fungus control agent comprising the fluorine-containing pyrimidine compound according to item [1] or a salt thereof as active ingredient.

[3] A method for producing a fluorine-containing pyrimidine compound comprising the steps of:

(a) reacting an aniline or a derivative thereof represented by a following general formula (4) with a fluorine-containing pyrimidine compound represented by a following general formula (5) to obtain a fluorine-containing pyrimidine compound represented by a following general formula (1):

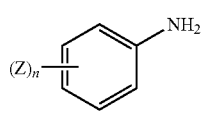

(4)

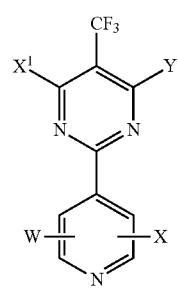

(5)

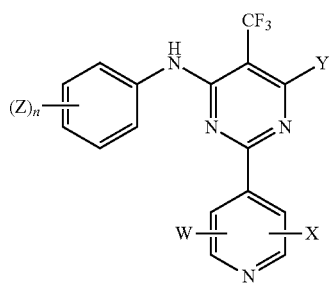

(1)

(b) reacting aniline or a derivative thereof represented by a following general formula (4) with a fluorine-containing pyrimidine compound represented by a following general formula (6) to obtain a fluorine-containing pyrimidine compound represented by a following general formula (2):

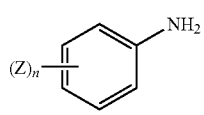

(4)

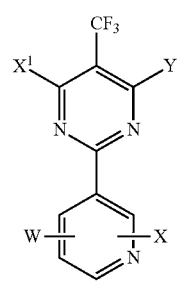

(6)

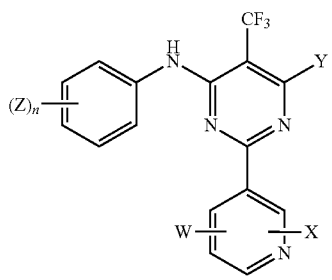

(2)

(c) reacting aniline or a derivative thereof represented by a following general formula (4) with a fluorine-containing pyrimidine compound represented by a following general formula (7) to obtain a fluorine-containing pyrimidine compound represented by a following general formula (3):

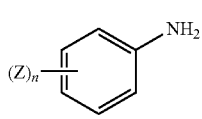

(4)

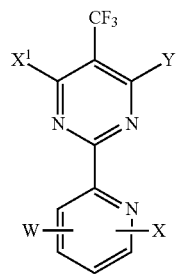

(7)

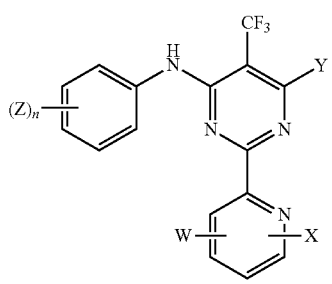

(3)

wherein in the above general formulas (1) to (7), W, X, Y, Z and n are as defined above, and $X^1$ represents a halogen atom.

[4] A method for producing a fluorine-containing pyrimidine compound comprising the steps of:

(d) reacting an aryl halide or a derivative thereof represented by a following general formula (8) with a fluorine-containing pyrimidine compound represented by a following general formula (9) to obtain a fluorine-containing pyrimidine compound represented by a following general formula (1):

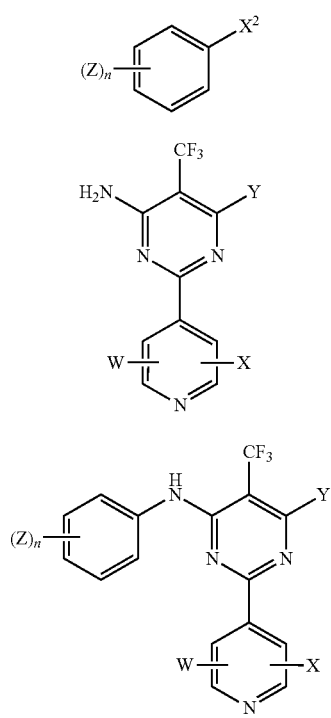

(e) reacting an aryl halide or a derivative thereof represented by a following general formula (8) with a fluorine-containing pyrimidine compound represented by a following general formula (10) to obtain a fluorine-containing pyrimidine compound represented by a following general formula (2):

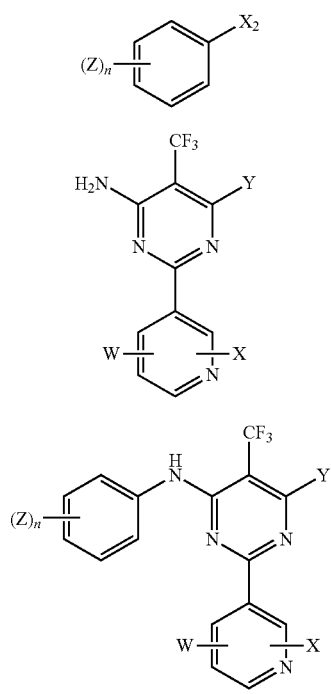

or (f) reacting an aryl halide or a derivative thereof represented by a following general formula (8) with a fluorine-containing pyrimidine compound represented by a following general formula (11) to obtain a fluorine-containing pyrimidine compound represented by a following general formula (3):

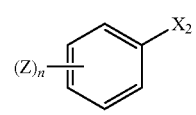

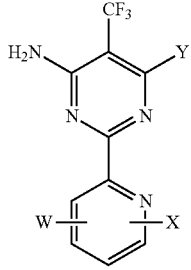

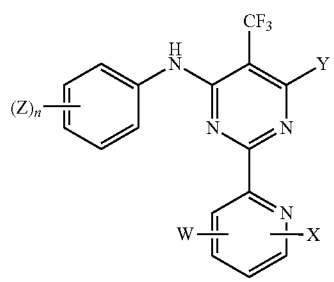

wherein in the above general formulas (1) to (3) and (8) to (11), W, X, Y, Z and n are as defined above, and $X^2$ represents a halogen atom.

According to the present disclosure, a novel fluorine-containing pyrimidine compound and a method for producing the same can be provided.

DETAILED DESCRIPTION

[Fluorine-Containing Pyrimidine Compound]

The fluorine-containing pyrimidine compound of the present disclosure is represented by the following general formula (1), (2) or (3):

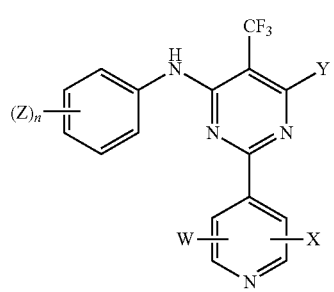

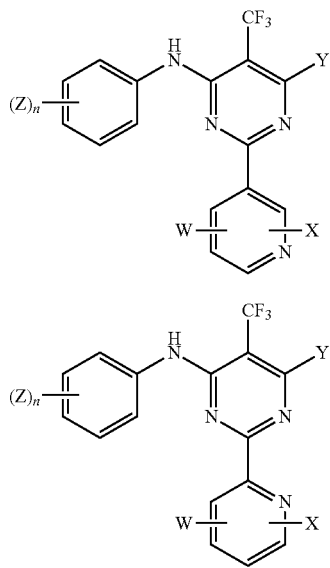

wherein in the general formulas (1) to (3), W and X each independently represent a hydrogen atom, a halogen atom, a hydrocarbon group having 1 to 10 carbon atoms, —$C_mF_{2m+1}$ (m is an integer of 1 to 10), a nitro group, —$OA^1$, —$SO_lA^1$ (l is an integer from 1 to 3), —$SA^1$, —$NA^1A^2$, —$B(OA^1)(OA^2)$, —$COA^1$, —$COOA^1$ or —$CONA^1A^2$;

Y represents a halogen atom or —$OA^3$

Z represents a halogen atom, a hydrocarbon group having 1 to 10 carbon atoms, —$C_mF_{2m+1}$ (m is an integer of 1 to 10), a nitro group, —$OA^1$, —$SO_lA^1$ (l is an integer of 1 to 3), —$SA^1$ or —$NA^1A^2$;

$A^1$ and $A^2$ each independently represent a hydrogen atom or a hydrocarbon group having 1 to 10 carbon atoms;

$A^3$ represents a hydrocarbon group having 1 to 12 carbon atoms;

n represents an integer of 0 to 3;

$A^1$, $A^2$, m and l each may be the same or different in W, X and Z; and when a plurality of Z is present, they may be the same or different.

When Y is a halogen atom, the halogen atom is F, Cl, Br or I, and preferably F or Cl.

When Y is —$OA^3$, $A^3$ represents a hydrocarbon group having 1 to 12 carbon atoms. $A^3$ is not particularly limited as long as it is a hydrocarbon group consisting of carbon atoms and hydrogen atoms, having 1 to 12 carbon atoms, and examples thereof include a chain hydrocarbon group, an aromatic hydrocarbon group, and an alicyclic hydrocarbon group. The chain hydrocarbon group is not particularly limited as long as the total number of carbon atoms is 1 to 12, and may be a straight-chain hydrocarbon group or a branched-chain hydrocarbon group. The aromatic hydrocarbon group is not particularly limited as long as the total number of carbon atoms is 6 to 12, and may be an aromatic hydrocarbon group having a substituent or an aromatic hydrocarbon group having no substituent. Alternatively, the aromatic hydrocarbon group may have a condensed polycyclic structure. The alicyclic hydrocarbon group is not particularly limited as long as the total number of carbon atoms is 3 to 12, and may be an alicyclic hydrocarbon group having a substituent or an alicyclic hydrocarbon group having no substituent. Alternatively, the alicyclic hydrocarbon group may have a bridged ring structure.

Examples of the chain hydrocarbon groups represented by $A^3$ include an alkyl groups such as a methyl group, an ethyl group, a n-propyl group, an isopropyl group, a n-butyl group, an isobutyl group, an s-butyl group, a t-butyl group, a pentyl group, a hexyl group, a heptyl group, an octyl group, a nonyl group, a decyl group, an undecyl group, and a dodecyl group; an alkenyl group such as an ethenyl group, a propenyl group, a butenyl group, a pentenyl group, a hexenyl group, a heptenyl group, an octenyl group, a nonenyl group, a decenyl group, an undecenyl group, an dodecenyl group; and an alkynyl group such as an ethynyl group, a propynyl group, a butynyl group, a pentynyl group, a hexynyl group, a heptynyl group, an octynyl group, a nonynyl group, a decynyl group, an undecynyl group and a dodecenyl group.

Examples of the aromatic hydrocarbon group represented by $A^3$ include a phenyl group, a benzyl group, a tolyl group, and a naphthyl group. The tolyl group may be any one of an o-tolyl group, an m-tolyl group and a p-tolyl group, and a p-tolyl group is preferred.

Examples of the alicyclic hydrocarbon group represented by $A^3$ include a saturated or unsaturated cyclic hydrocarbon group. Examples of the cyclic hydrocarbon group include a cyclopropyl group, a cyclobutyl group, a cyclohexyl group, a cyclopentyl group, an adamantyl group, and a norbornyl group.

It is preferable that W and X be a hydrogen atom, a halogen atom or a hydrocarbon group having 1 to 10 carbon atoms, and a hydrogen atom is more preferred. W and X may be the same or different. It is particularly preferable that both W and X are hydrogen atoms. It is preferable that Z be a halogen atom, a hydrocarbon group having 1 to 10 carbon atoms, —$C_mF_{2m+1}$ (m is an integer of 1 to 10) or a nitro group.

When a plurality of Z is present and all of the plurality of Z are hydrocarbon groups, the total number of carbon atoms of the hydrocarbon groups Z may be 5 or more. On this occasion, n is an integer of 1 to 3.

In W, X and Z, the halogen atom is F, Cl, Br or I, and F or Cl is preferred.

In W, X and Z, the hydrocarbon group having 1 to 10 carbon atoms is not particularly limited as long as it is a hydrocarbon group consisting of a carbon atom and a hydrogen atom, having 1 to 10 carbon atoms, and examples thereof include a hydrocarbon group having 1 to 10 carbon atoms among the hydrocarbon groups described in the explanation of $A^3$.

In W, X and Z, —$C_mF_{2m+1}$ is not particularly limited as long as it is a perfluoroalkyl group consisting of carbon atoms and fluorine atoms. The —$C_mF_{2m+1}$ may be in a straight chain form or a branched form. Here, m is an integer of 1 to 10, and an integer of 1 to 3 is preferred.

In —$OA^1$, —$SO_lA^1$, —$SA^1$, and —$NA^1A^2$ in W, X and Z, and in —$B(OA^1)(OA^2)$, —$COA^1$, —$COOA^1$, and —$CONA^1A^2$ in W and X, $A^1$ and $A^2$ each independently represent a hydrogen atom or a hydrocarbon group having 1 to 10 carbon atoms. $A^1$ and $A^2$ may be the same or different. Examples of the hydrocarbon group having 1 to 10 carbon atoms include a hydrocarbon group having 1 to 10 carbon atoms among the hydrocarbon groups described in the explanation of $A^3$. Here, l is an integer of 1 to 3, and 1 is preferred.

[Harmful Fungus Control Agent]

The harmful fungus control agent of the present disclosure contains a fluorine-containing pyrimidine compound of the present disclosure or a salt thereof as an active ingredient. The harmful fungus control agent of the present disclosure may contain one or more of fluorine-containing pyrimidine compounds or salts thereof.

In the case where the harmful fungus control agent of the present disclosure contains a salt of the fluorine-containing pyrimidine compound of the present disclosure, examples of the salt of the fluorine-containing pyrimidine compound of the present disclosure include a hydrochloride, a hydrobromide, an acetate and a sulfate.

The harmful fungus control agent of the present disclosure is particularly suitable for controlling many fungi sticking to various cultivated plant such as wheat, rye, barley, oats, rice, corn, pasture grass, banana, cotton, soybean, coffee trees, sugar cane, vines, fruit trees and foliage plant; vegetables such as cucumbers, beans, tomatoes, potatoes and gourds; and the seeds of these plants.

The harmful fungus control agent of the present disclosure is particularly suitable for controlling the following plant diseases caused by harmful fungi:

blast (*Primularia oryzae*), brown spot (*Cochliobolus miyabeanus*), sheath blight (*Rizoctonia solani*), etc. of rice;

powdery mildew (*Erysiphe graminis*), scab (*Gibberberella zeae*), leaf rust (*Puccinia satriiformis, P. graminis, P. recondita, P. hordei*), snow mold (*Typhula* sp., *Micronectruela nivalis*), loose smut (*Ustilago tritici, U. nuda*), stinking smut (*Tilletia caries*), eyespot (*Pseudocercosporella herpotrichoide*), scald (Rhynchosporium secalis), leaf blight (*Septoria tritici*), glume blotch (*Leptosphaeria nodorum*), net spot (*Pyrenophora teres*), zonate leaf spot (*Helminthosporium zonatum* Ikata), etc. of wheat;

black spot (*Diaporthe citri*), scab (*Elsinoe fawcetti*), fruit rot (*Penicillium digitatum, P. italicum*), brown rot (*Phytophthora citrophthora, P. nicotianae*), black leaf spot (*Phyllostictina citricarpa*), and canker (*Xanthomonas citri*), etc. of citrus fruits;

blossom blight (*Monilia mali*), canker (*Valsa mali*), powdery mildew (*Podosphaera leucotricha*), Alternaria blotch (*Alternaria mali*), scab (*Venturia inaequalis*), fruit spot (*Mycospherella pomi*), anthracnose (*Colletotrichum acutatum*), ring rot (*Botryosphaeria berengeriana*), rust (*Gymnosporangium yamadae*), brown rot (*Monililinia fructicola*), etc. of apples;

scab (*Venturia nashicola, V. pirina*), black spot (*Alternaria kikuchiana*), red spot (*Gymnosporangium haraeanum*), gray spot (*Monilinia fructicola*), etc. of pears;

gray spot (*Monilinia fructicola*), black spot (*Cladosporium caepophilum*), Phomopsis rot (*Phomopsis* sp.), etc. of peaches;

anthracnose (*Elinoe ampelina*), ripe rot (*Colletotrichum acutatum*), powdery mildew (*Uncinula necaator*), rust (*Phakopsora ampelopsidis*), black rot (*Guignardia bidiwellii*), downy mildew (Plasmopara viticola), brown rot (*Monilinia fructigena*), scab (*Cladosporium viticolum*), gray mold (*Botrytis cinerea*), etc. of grapes;

anthracnose (*Gloeosporium kaki*) and leaf spot (*Cercospora kaki, Mycoshaerella nawae*) of persimmons; anthracnose (*Colletotrichum lagenarium*), powdery mildew (*Sphaerotheca fuliginea, Oidiopsis taurica*), gummy stem blight (*Didymella bryoniae*), Fusarium wilt (*Fusarium oxysporum*), downy mildew (*Pseudoperonospora cubensis*), phytophthora rot (*Phytophthora* sp.), damping-off (*Pythium* sp.), etc. of gourds;

early blight (*Alternaria solani*), leaf mold (*Cladosporium fulvum*), late blight (*Phytophthora infestans*), etc. of tomatoes;

brown spot (*Pomopsis vexans*), powdery mildew (*Erysiphe cichoracearum*), etc. of eggplants;

black spot (*Alternaria japonica*), white spot (*Cercosporella brassicae*), hollow stalk (*Erwinia carotovora*), etc. of cruciferous vegetables;

rust (*Puccinia allii*), etc. of green onions;

purple stain (*Cercospora kikuchii*), *sphaceloma* scab (*Elsinoe* glycines), black spot (*Diaporthe phaseolorum* var. *sojae*), etc. of soybeans;

anthracnose (*Colletotrichum lindemthianum*), etc. of kidney beans;

black leaf spot (*Cercospora personata*), brown spot (*Cercospora arachidicola*), etc. of peanuts;

powdery mildew (*Erysiphe pisi*), etc. of garden peas;

early blight (*Alternaria solani*), late blight (*Phytophthora infestans*), leaf rot fungus (*Rhizoctonia solani*), etc. of potatoes;

powdery mildew (*Sphaerrotheca humuli*), etc. of strawberries;

net blister blight (*Exobasidaium reticulatum*), leaf spot (*Elsinoe leucospira*), etc. of teas;

brown spot (*Alternaria longipes*), powdery mildew (*Erysiphe cichoracearum*), anthracnose (*Colletotrichum tabacum*), downy mildew (*Peronospora tabacina*), black shank (*Phytophthora nicotianae*), wild fire (*Pseudomonus syringae*), etc. of tobaccos;

brown spot (*Cercospora beticola*), damping-off (*Aphanomyces cochliodes*), etc. of sugar beets;

black spot (*Diplocarpon rosae*), powdery mildew (*Sphaerotheca pannosa*), etc. of roses;

brown spot (*Septoria chrysanthemi-indici*), white rust (*Puccinia horiana*), etc. of chrysanthemums; and gray mold (*Botrytis cinerea*), stem rot (*Sclerotinia sclerotiorum*), etc. of various crops.

The harmful fungus control agent of the present disclosure is particularly suitable for controlling fungi and molds that cause plant diseases such as late blight of tomatoes, leaf rust of wheats, powdery mildew of cucumbers, gray mold of cucumbers and kidney beans, and leaf rot of kidney beans.

In practical use of the harmful fungus control agent of the present disclosure, the fluorine-containing pyrimidine compound or salt thereof of the present disclosure may be used as it is in a pure form without adding other ingredients. Alternatively, the agent may be used in a form of conventional agricultural chemicals including solid formulations such as granules, powders, formulations for widespread application or dispersible products; and liquid formulations such as hydrating agents, emulsions, aqueous solutions, solutions, pastes, oil dispersions, dispersion formulations, emulsion formulations, oil agent, aerosols, sprays or flowable formulations. The form of application depends on a specific purpose, and in each case, it is preferred that the fluorine-containing pyrimidine compound or the salt thereof of the present disclosure be finely and uniformly dispersed.

The harmful fungus control agent of the present disclosure may be prepared by a known method. For example, the preparation may be performed by applying the fluorine-containing pyrimidine compound of the present disclosure or a salt thereof into a solvent and/or onto a solid carrier, with use of auxiliary agents such as emulsifiers and dispersants on an as needed basis.

Examples of the solvent include water, aromatic solvents (e.g., toluene, xylene, etc.), paraffins (e.g., mineral oil fractions, etc.), alcohols (e.g., methanol, butanol, pentanol, benzyl alcohol, etc.), ketones (e.g., cyclohexanone, γ-butyl lactone, etc.), pyrrolidones (e.g., NMP, NOP, etc.), acetates (e.g., glycol diacetate, etc.), glycols, fatty acid dimethylamides, fatty acids, and fatty acid esters. Two or more solvents may be mixed for use.

Examples of the solid carriers include mineral earths (e.g., silica gel, silicate, talc, kaolin, attaclay, limestone, lime, chalk, bolus clay, ocher, clay, dolomite, diatomaceous earth, calcium sulfate, magnesium sulfate, magnesium oxide, etc.), pulverized synthetic materials, fertilizers (e.g., ammonium sulfate, ammonium phosphate, ammonium nitrate or urea, etc.), products of plant origin (e.g., flour, bark powder, wood powder, nut powder, etc.), and cellulose powder.

Examples of the emulsifiers include nonionic or anionic emulsifiers (e.g., polyoxyethylene fatty alcohol ethers, alkylsulfonates or arylsulfonates). Examples of the dispersants include waste fluid of lignosulfite and methylcellulose.

The harmful fungus control agent of the present disclosure may contain a surfactant. Examples of the suitable surfactants include alkali metal salts, alkaline earth metal salts or ammonium salts of compounds selected from the group consisting of lignosulfonic acid, naphthalenesulfonic acid, phenolsulfonic acid, dibutylnaphthalenesulfonic acid, an alkylarylsulfonic acid, an alkylsulfonic acid, an alkylsulfonate, a fatty alcohol sulfate, a fatty acid, and a sulfated fatty alcohol glycol ether; condensates of sulfonated naphthalene and naphthalene derivatives with formaldehyde; condensates of naphthalene or naphthalene sulfonic acid with phenol and formaldehyde; polyoxyethylene octylphenyl ether, ethoxylated isooctylphenol, octylphenol, nonylphenols, an alkylphenyl polyglycol ether, tributylphenyl polyglycol ether, tristearylphenyl polyglycol ether, and an alkylaryl polyether alcohol; a condensate of an alcohol and a fatty alcohol/ethylene oxide; an ethoxylated castor oil, a polyoxyethylene alkyl ether, an ethoxylated polyoxypropylene, lauryl alcohol polyglycol ether acetal, a sorbitol ester, a waste fluid of lignosulfite, and methylcellulose.

In the case where the harmful fungus control agent of the present disclosure is a directly sprayable solution, emulsion, paste, or oil dispersion, it is preferable that the harmful fungus control agent of the present disclosure contain a mineral oil fraction having a medium to high boiling point (e.g., kerosene and diesel oil); a coal tar oil; an oil derived from vegetables or animals; an aliphatic, alicyclic or aromatic hydrocarbon (e.g., toluene, xylene, a paraffin, tetrahydronaphthalene, an alkylated naphthalene, and a derivative thereof), methanol, ethanol, propanol, butanol, cyclohexanol, cyclohexanone, isophorone; or a strongly polar solvent (e.g., dimethylsulfoxide, N-methylpyrrolidone and water).

In the case where the harmful fungus control agent of the present disclosure is a powder, a formulation for widespread application or a dispersible product, the harmful fungus control agent of the present disclosure may be produced by mixing the fluorine-containing pyrimidine compound of the present disclosure or a salt thereof with a solid carrier, or by pulverizing the same together with the solid carrier at the same time.

In the case where the harmful fungus control agent of the present disclosure is a granule such as a coated granule, an impregnated granule or a homogeneous granule, the harmful fungus control agent of the present disclosure may be produced by combining the fluorine-containing pyrimidine compound of the present disclosure or a salt thereof with the solid carrier.

The content of the fluorine-containing pyrimidine compound of the present disclosure or a salt thereof in the harmful fungus control agent of the present disclosure varies depending on the formulation form, application method and other conditions. The harmful fungus control agent of the present disclosure may contain the fluorine-containing pyrimidine compound of the present disclosure or a salt thereof alone depending on the case. However, the content of the fluorine-containing pyrimidine compound of the present disclosure or a salt thereof in the harmful fungi control agent of the present disclosure is usually 0.2 to 95 mass %, preferably 0.5 to 70 mass %.

The harmful fungus control agent of the present disclosure has an excellent control effect through foliage application at a concentration of, for example, 10 to 4000 ppm. Although depending on the method, season and other conditions, the amount of active ingredient used per 1 $m^2$ is usually 10 to 300 mg, preferably 15 to 200 mg, when used as an agricultural or horticultural agent, an agent against forest pests and an agent against pasture pests. When used as a sanitary insecticide, the amount of active ingredient used per 1 $m^2$ is usually 2 to 200 mg, preferably 5 to 100 mg. Also, for example, when used as a powder, the amount of active ingredient used per 1 $m^2$ is usually 15 to 120 mg; when used as a granule, the amount of active ingredient used per 1 $m^2$ is usually 30 to 240 mg; and when used as an emulsion, the amount of active ingredient used per 1 $m^2$ is usually 40 to 250 mg. However, in special cases, the amount may be lower than the range, and in some cases, the amount needs to be lower than the range.

Examples of the methods for producing the harmful fungus control agent of the present disclosure in each form are shown as follows.

1. Products to be Diluted with Water

Water-Soluble Chemical

The fluorine-containing pyrimidine compound or a salt thereof of the present disclosure is dissolved in water or a water-soluble solvent. Optionally, a wetting agent or other auxiliary agents may be added.

Dispersion Formulation

The fluorine-containing pyrimidine compound of the present disclosure or a salt thereof is dissolved in cyclohexanone with a dispersant (e.g., polyvinylpyrrolidone, etc.) added thereto. Through dilution with water, a dispersion formulation is obtained.

Emulsion

The fluorine-containing pyrimidine compound of the present disclosure or a salt thereof is dissolved in xylene with calcium dodecylbenzenesulfonate and castor oil ethoxylate added thereto. Through dilution with water, an emulsified liquid is obtained.

Emulsion Formulation

The fluorine-containing pyrimidine compound or a salt thereof of the present disclosure is dissolved in xylene with calcium dodecylbenzenesulfonate and castor oil ethoxylate added thereto. The mixture is introduced into water using an emulsifier to form a homogeneous emulsion. Through dilution with water, an emulsified liquid is obtained.

Flowable Formulation

A fine suspension of an active compound is obtained by adding a dispersant or a wetting agent and water or an organic solvent to the fluorine-containing pyrimidine compound of the present disclosure or a salt thereof and finely pulverizing the mixture in a ball mill under stirring. Through dilution with water, a stable suspension is obtained.

Granular Hydrating Agent and Granular Water-Soluble Agent

To the fluorine-containing pyrimidine compound or a salt thereof of the present disclosure, a dispersant and a wetting agent are added and finely pulverized to make a granular hydrating agent or a granular water-soluble agent with use of a dedicated device (e.g., extruder, spray tower, fluidized bed, etc.). Through dilution with water, a stable dispersion or solution is obtained.

Powdery Hydrating Agent and Powdery Water-Soluble Agent

In a rotor-stator mill, a dispersant, a wetting agent and silica gel are added to the fluorine-containing pyrimidine compound of the present disclosure or a salt thereof and pulverized. Through dilution with water, a stable dispersion or solution is obtained.

2. Product to be Applied without Dilution

Powdery Agent

The fluorine-containing pyrimidine compound of the present disclosure or a salt thereof is finely pulverized and thoroughly mixed with finely pulverized kaolin. Thereby, a powdery product is obtained.

3. Granular Agent

The fluorine-containing pyrimidine compound of the present disclosure or a salt thereof is finely pulverized and combined with a carrier. On this occasion, an extrusion method, a spray drying method, or a fluidized bed method may be used. Thereby, a granule to be applied without dilution is obtained.

Solution Agent (ULV Solution Agent)

The fluorine-containing pyrimidine compound of the present disclosure or a salt thereof is dissolved in an organic solvent (e.g., xylene, etc.). Thereby, a product to be applied without dilution with water is obtained.

The harmful fungus control agent of the present disclosure may be used through sprinkling, spraying, scattering, wide-spreading, water-sprinkling or the like. As the form on this occasion, one may be selected from the forms described above according to the purpose. In any form, it is preferable that the fluorine-containing pyrimidine compound of the present disclosure or a salt thereof be dispersed as finely as possible for use.

An aqueous application form may be prepared by adding water to an emulsion, a paste or a hydrating agent (for example, powder for spreading, and an oil-based dispersant). The emulsion, the paste or the hydrating agent may be prepared by homogenizing the fluorine-containing pyrimidine compound or a salt thereof of the present disclosure directly or through dissolution in an oil or solvent, with use of a wetting agent, a tackifier, a dispersant or an emulsifier. Alternatively, a concentrate comprising the fluorine-containing pyrimidine compound of the present disclosure or a salt thereof, a wetting agent, a tackifier, a dispersant or an emulsifier, and a solvent or oil on an as needed basis may be prepared, and such a concentrate is suitable for dilution with water.

In the case of using the harmful fungus control agent of the present disclosure as a ready-to-use preparation, the concentration of the fluorine-containing pyrimidine compound of the present disclosure or a salt thereof may be set within a relatively wide range, usually 0.0001 to 10 mass %, preferably 0.01 to 1 mass %.

To the harmful fungus control agent of the present disclosure, various types of oils, wetting agents, adjuvants, etc. may be added on an as needed basis immediately before use (tank mix). These may be added, for example, in an amount of 0.1 to 10 parts by mass relative to 1 part by mass of the harmful fungus control agent of the present disclosure.

The harmful fungus control agent of the present disclosure is sufficiently effective even when used alone in the form of application as a harmful fungi control agent. However, in addition to the harmful fungus control agent of the present disclosure, other agents such as herbicides, insecticides, attractants, growth regulators, disease control agents (such as fungicides), fertilizers may also be present together. Accordingly, the harmful fungus control agent of the present disclosure may be also used in combination of the fluorine-containing pyrimidine compound of the present disclosure or a salt thereof and at least one of other agents such as herbicides, insecticides, attractants, growth regulators, disease control agents (fungicides, etc.) and fertilizers. In particular, the fluorine-containing pyrimidine compound or salt thereof of the present disclosure tends to broaden the spectrum of fungicidal activity when combined with other fungicides.

Representative examples of the other agents that may be included in the harmful fungus control agent of the present disclosure are shown as follows. Since the following description is intended to exemplify other agents that can be combined with the fluorine-containing pyrimidine compound of the present disclosure or a salt thereof, the other agents are not limited thereto.

Disease Control Agent:

copper-based disease control agents such as basic copper chloride, cupric hydroxide, basic copper sulfate, anhydrous copper sulfate, oxine-copper, copper nonylphenolsulfonate, DEBDC, and quicklime;

inorganic agents such as sulfur, calcium polysulfide, zinc sulfate, sodium hydrogen carbonate, potassium hydrogen carbonate, and sodium hypochlorite;

organic sulfur-based agents such as zineb, maneb, manzeb, ambam, polycarbamate, organic sulfur nickel salt, propineb, ziram, thiuram, and thiadiazine;

organophosphorous agents such as IBP, EDDP, tolclofos-methyl, and fosetyl;

melanin synthesis inhibitors such as fthalide, tricyclazole, pyroquilone, carpropamide, diclocimet, and phenoxanyl;

benzimidazole-based agents such as benomyl, thiophanate methyl, and thiazendazole;

dicarboximide-based agents such as iprodione and procymidone;

carboxanilide-based agents such as oxycarboxin, mepronil, flutolanil, furametpyr, and thifluzamide;

phenylamide-based agents such as metalaxyl and oxadixyl;

sterol biosynthesis inhibitors such as triadimefon, bitertanol, fenbuconazole, myclobutanil, hexaconazole, tebuconazole, propiconazole, difenoconazole, ipconazole, imibenconazole, cyproconazole, triflumizole, prochloraz, pefurazoate, oxpoconazole fumarate, fenarimol, pyrifenox, trifolin, tetraconazole, and simeconazole;

strobilurin-based agents such as azoxystrobin, cresoxim methyl, trifloxystrobin, metominostrobin, pyraclostrobin, orysastrobin, picoxystrobin, and fluoxastrobin;

anilinopyrimidine-based agents such as pyrimethanil, mepanipyrim, and cyprodinil;

synthetic antibacterial agents such as tecloftalam and oxolinic acid;

other synthetic disease control agents such as probenazole, acibenzolar-S-methyl, isoprothiolane, ferimzone, diclomezine, pencycuron, fluoroimide, captan, dichlofluanid, tolylfluanid, chlorothalonil, dithianone, quinomethionate, dinocap, dimethirimol, diflumetorim, fludioxonil, benthiazole, triazine, fluazinam, cymoxanil, famoxadone, iminoctadine triacetate, iminoctadine albesilate, propamocarb hydrochloride, dimethomorph, diazofamide, fenhexamide, diethoxy fencarb, tiadinil, benthiavalicarb isopropyl, and ethaboxam;

Antibiotics such as Blasticidin S, Kasugamycin, polyoxin, Validamycin A, Streptomycin, oxytetracycline, and Mildiomycin;

Natural agents such as machine oil, rapeseed oil, and soybean lecithin;

biological agents such as extract of *Lentinura edodes* mycelium, *Trichoderma* bacteria, *Agrobacterium radiobacter*, non-pathogenic *Erwinia carotovora* subspecies, *Bacillus subtilis, Talaromyces flavus, Pseudomonas fluorescens, Pseudomonas* CAB-2, and non-pathogenic *Fusarium oxysporum*; and soil disease control agents such as flusulfamide, hydroxyisoxazole, echlomezol, dazomet, chloroneb, metasulfocarb, methylisothiocyanate, D-D, methyl bromide, chloropicrin, and carbam;

Insecticides (Pest and Tick Control Agents):

Organophosphorus-based pest control agents such as cyanophos, fenthion, fenitrothion, dichlofenthion, pirimiphos-methyl, diazinon, quinalphos, isoxathion, pyridafenthion, chlorpyrifos-methyl, chlorpyrifos, vamidothion, malathion, phenthoate, dimethoate, thiomethone, disulfoton, phosarone, methidathion, prothiofos, sulprofos, profenofos, pyraclofos, dichlorvos, monocrotophos, naled, tetrachlorbinphos, dimethylvinfos, chlorfenvinfos, propafos, acephate, isofenphos, trichlorfon, EPN, and ethion;

Carbamate-based pest control agents such as carbaryl, isoprocarb, fenocarb, propoxur, XMC, ethiofencarb, pirimicarb, bendiocarb, carbosulfan, benfuracarb, furathiocarb, methomyl, oxamyl, thiodicarb, and alanycarb;

Pyrethroid-based pest control agents such as allethrin, resmethrin, permethrin, cymermethrin, cyhalothrin, cyfluthrin, tralomethrin, fenpropathrin, bifenthrin, fenvalerate, flucythrinate, fluvalinate, acrinathrin, cycloprothrin, etofenprox, silafluofen, and tefluthrin;

nereistoxin-based pest control agents such as cartap, thiocyclam, and bensultap;

neochicotinoid-based pest control agents such as imidacloprid, acetamiprid, nitenpyram, thiacloprid, thiamethoxam, clothianidin, and dinotefuran;

insect growth regulators such as buprofezin, isoprothionelane, diflubenzuron, teflubenzuron, hexaflumuron, lufenuron, flufenoxuron, chlorfluazuron, tebufenozide, chromafenozide, and cyromazine;

other synthetic pest control agents such as benzoepine, fipronil, pymetrozine, chlorfenapyr, diafenthiuron, indoxacarb, emamectin benzoate, sodium oleate, potassium oleate, DBEDC, metaldehyde, adhesives, methoxyfenozide, and tolfenpyrad;

natural pest control agents such as pyrethrin, rotenone, nicotine, machine oil, rapeseed oil, soy lecithin, starch, fatty acid glycerides, propylene glycol mono-fatty acid esters, and diatomaceous earth;

acaricides such as kelthane, phenisobromolate, tetradifon, propargite, quinomethionate, amitraz, phenothiocarb, hexythiazox, fenbutatin oxide, dienochlor, fenpyroximate, tebufenpyrad, fluazinam, pyridaben, pyrimidifen, clofentezine, etoxazole, dinocap, halfenprox, polynactin complex, milbemectin, bialaphos, acequinocyl, bifenazate, and fluacrypyrim;

nematicides such as D-D, DCIP, dazomet, benomyl, ethoprophos, fosthiazate, mesulfenphos, morantel tartrate, cadusafos, levamisole hydrochloride, and nemadectin;

fumigants such as methyl bromide, chloropicrin, carbam, carbam sodium salt, hydrocyanic acid, hydrogen phosphide, aluminum phosphide, ethylene oxide, carbon dioxide, methyl isothiocyanate, and sulfuryl fluoride;

biological pest control agents such as BT, Spinosad, *Beauveria brongniati, Beauveria bassiana, Verticillium lecanii, Steinanema capocapsae, Steinanema kushidai, Steinanema glaceri, Monacrosporium fimatopagam, Pasteuria penetrans, Pechyromyces fumosoroseus*, and natural enemies (*Phytoseiulus persimilis, Amblyseius cucumeris, Aphidius colemani, Encarsia formosa, Eretmocerus eremicus, Dacnusa sibirica, Dacnusa sibirica Telenga, Aphidoletes aphidimyza, Orius strigicollis*, and *Chrysoperla nipponensis*).

Attractant:

insect pheromone attractants such as litrua, beet army lure, diamolure, peach flua, tetradecenyl acetate, tortrilure, pirymarua, oriflure, cheritlure, bluetlure, lowculure, phycilure, okimelanolure, sakimelanolure, sweetbeelure, and fallweblure;

other attractants such as pinene oil, methyl eugenol, protein hydrolysate, cue-lure, and methyl phenyl acetate;

rodenticides such as monofluoroacetate, coumatetralyl, warfarin, chlorophacinone, diphacinone, zinc phosphide, and thallium sulfate; and lime nitrogen, etc.

Herbicides:

phenoxy-based herbicides such as 2,4-PA, MCPA, MCPB, MCPP, triclopyr, clomeprop, naproanilide, fenoxaprop-ethyl, cyhalopop-butyl, fluazipop, and quizalopop-ethyl;

carbamate-based herbicides such as IPC, phenmedipham, desmedifam, bentiocarb, orthobencarb, esprocarb, molinate, dimepiperate, and pyributicarb;

acid amide-based herbicides such as DCPA, alachlor, pretilachlor, metolachlor, butachlor, dimethenamide, thenylchlor, bromobutide, etobenzanide, diflufenican, mefenacet, napropamide, caffenstrol, propyzamide, isoxaben, and ashram;

urea-based herbicides such as DCMU, linuron, siduron, daimuron, cumyluron, carbutyrate, isouron, and tebuthiouron;

sulfonylurea-based agents such as bensulfuron-methyl, ethoxysulfuron, pyrazosulfuron-ethyl, azimsulfuron, halosulfuron-methyl, flazasulfuron, cinosulfuron, nicosulfuron, rimsulfuron, thifensulfuron-methyl, imazosulfuron, metsulfuron-methyl, and cyclosulfamron;

pyrimidyloxybenzoic acid-based herbicides such as pyriminobac-methyl, and bispyribac sodium salt;

triazine-based herbicides such as CAT, atrazine, simetryn, ametryn, prometryn, dimethametryn, cyanazine, triaziflam, and metribuzin;

diazine-based herbicides such as terbacil, bromacil, butafenacil, lenacil, PAC, bentazone, and pyridate;

diazole-based herbicides such as pyrazolate, pyrazoxyfen, benzofenap, and pyraflufenethyl;

bipyridylium-based herbicides such as paraquat and diquat;

dinitroaniline-based herbicides such as trifluralin, bethrodine, prodiamine, pendimethalin, and oryzalin;

aromatic carboxylic acid-based herbicides such as MDBA, imazapyr, imazaquin, imazaquin ammonium salt, dithiopyr, TCTP, imazamox ammonium salt, and fentrazamide;

aliphatic herbicides such as pelargonic acid, DPA, and tetrapion;

organophosphorous-based herbicides such as piperophos, amiprofos-methyl, butamifos, and SAP;

amino acid-based herbicides such as glyphosate isopropylamine salt, glyphosate ammonium salt, glyphosate trimesium salt, glyphosate potassium salt, bialaphos, and glufosinate;

other organic herbicides such as ioxynil, bifenox, DBN, DCBN, sethoxydim, clethodim, tepraloxydim, CAN, indanophan, chlorphthalim, endothal disodium salt, benfuresate, florasulam, pentoxazone, oxaziclomefone, carfentrazone-ethyl, flumioxazin, and benzobicyclon; and inorganic herbicides such as cyanates.

It is preferable that the other agents described above be added in an amount that allows each agent to sufficiently exhibit the desired effect, though depending on the type thereof and the type of the harmful fungus control agent of the present disclosure used in combination. For example, the other agents described above are added in an amount of, for example, 0.1 to 1000 mass %, preferably 0.5 to 500 mass %, relative to the mass of the harmful fungus control agent.

[Method for Producing Fluorine-Containing Pyrimidine Compound]

Specific examples of the method for producing the fluorine-containing pyrimidine compound of the present disclosure include the following methods (a) to (f).

(a) Method for obtaining a fluorine-containing pyrimidine compound represented by the following general formula (1) including a step of reacting an aniline or a derivative thereof represented by the following general formula (4) with a fluorine-containing pyrimidine compound represented by the following general formula (5) in an organic solvent in the presence of a basic substance:

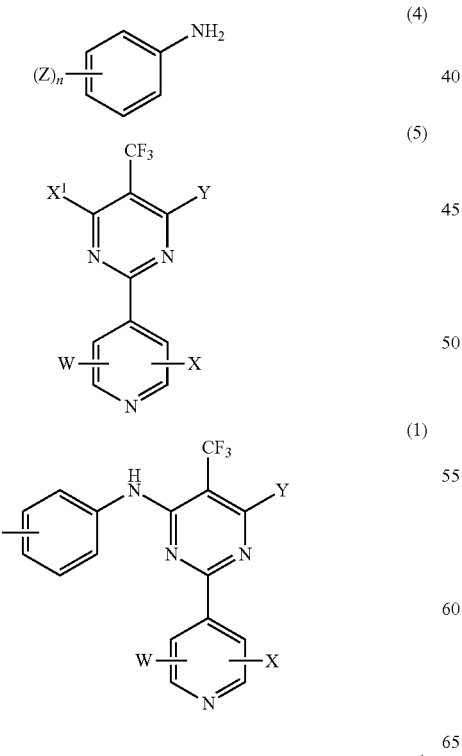

wherein W, X, Y, Z and n are as defined above, and $X^1$ represents a halogen atom.

(b) Method for obtaining a fluorine-containing pyrimidine compound represented by the following general formula (2) including a step of reacting an aniline or a derivative thereof represented by the following general formula (4) with a fluorine-containing pyrimidine compound represented by the following general formula (6) in an organic solvent in the presence of a basic substance:

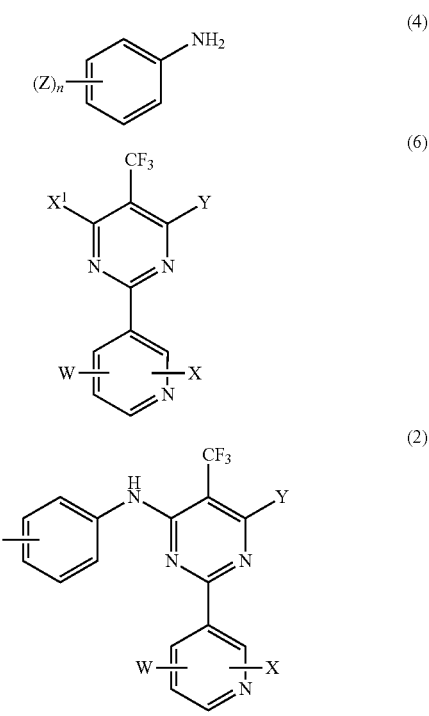

wherein W, X, Y, Z, $X^1$ and n are as defined above.

(c) Method for obtaining a fluorine-containing pyrimidine compound represented by the following general formula (3) including a step of reacting an aniline or a derivative thereof represented by the following general formula (4) with a fluorine-containing pyrimidine compound represented by the following general formula (7) in an organic solvent in the presence of a basic substance:

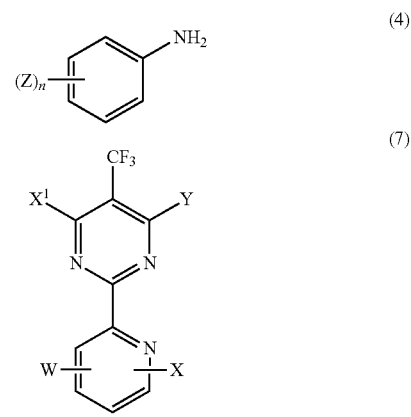

-continued

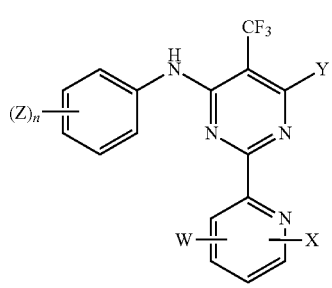
(3)

wherein W, X, Y, Z, $X^1$ and n are as defined above.

(d) Method for obtaining a fluorine-containing pyrimidine compound represented by the following general formula (1) including a step of reacting a halogenated aryl or a derivative thereof represented by the following general formula (8) with a fluorine-containing pyrimidine compound represented by the following general formula (9) in an organic solvent in the presence of a basic substance:

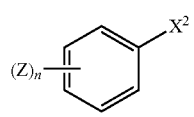
(8)

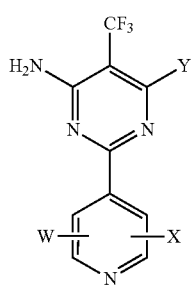
(9)

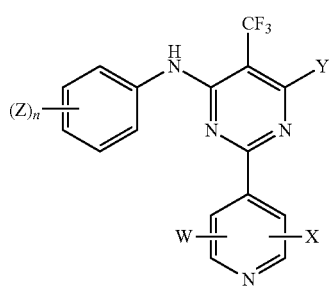
(1)

wherein W, X, Y, Z, and n are as defined above, and $X^2$ represents a halogen atom.

(e) Method for obtaining a fluorine-containing pyrimidine compound represented by the following general formula (2) including a step of reacting a halogenated aryl or a derivative thereof represented by the following general formula (8) with a fluorine-containing pyrimidine compound represented by the following general formula (10) in an organic solvent in the presence of a basic substance:

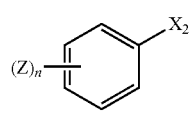
(8)

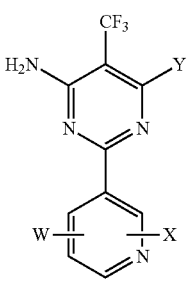
(10)

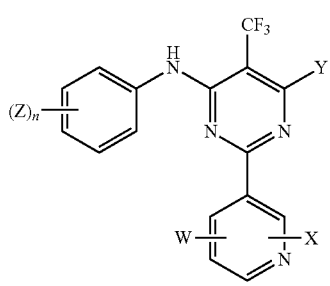
(2)

wherein W, X, Y, Z, $X^2$ and n are as defined above.

(f) Method for obtaining a fluorine-containing pyrimidine compound represented by the following general formula (3) including a step of reacting a halogenated aryl or a derivative thereof represented by the following general formula (8) with a fluorine-containing pyrimidine compound represented by the following general formula (11) in an organic solvent in the presence of a basic substance:

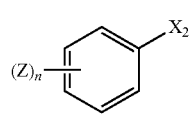
(8)

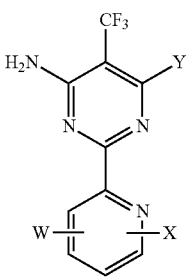
(11)

-continued

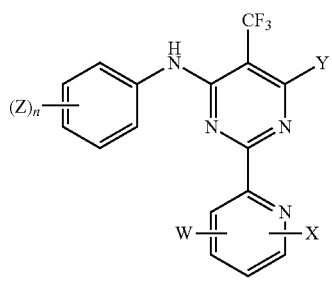
(3)

wherein W, X, Y, Z, $X^2$ and n are as defined above.

The compound represented by the general formula (4) is aniline when n=0, and is an aniline derivative when n=1 to 3. Further, the compound represented by the general formula (8) is an aryl halide when n=0, and an aryl halide derivative when n=1 to 3.

The fluorine-containing pyrimidine compounds represented by the general formulas (5) to (7) may be obtained by reacting a fluoroisobutylene derivative represented by the following general formula (12) or a fluoroisobutane derivative represented by the following general formula (13) with amidine derivatives represented by the following general formulas (14) to (16) as shown in the reaction formulas below. The reaction temperature during the reaction is preferably 0 to 100° C., more preferably 5 to 50° C., and still more preferably 10 to 20° C. Further, the reaction time is preferably 0.5 to 48 hours, more preferably 1 to 36 hours, and still more preferably 2 to 12 hours.

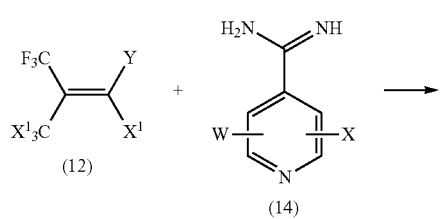

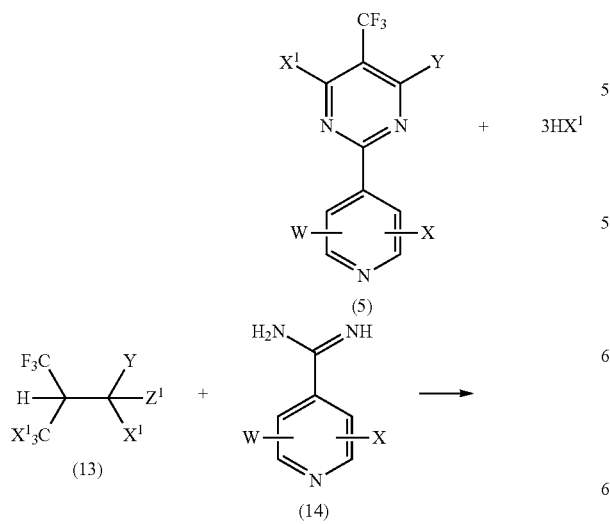

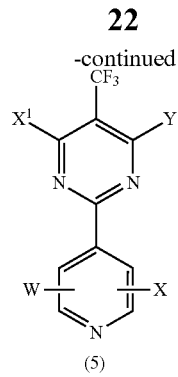

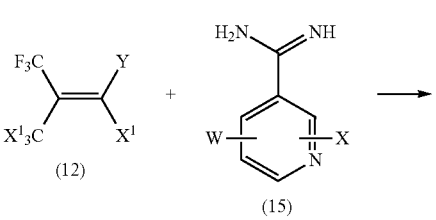

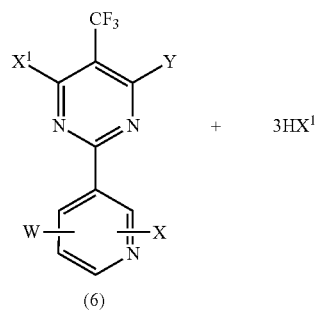

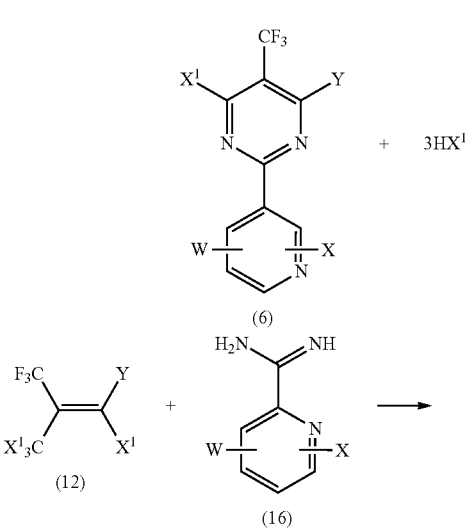

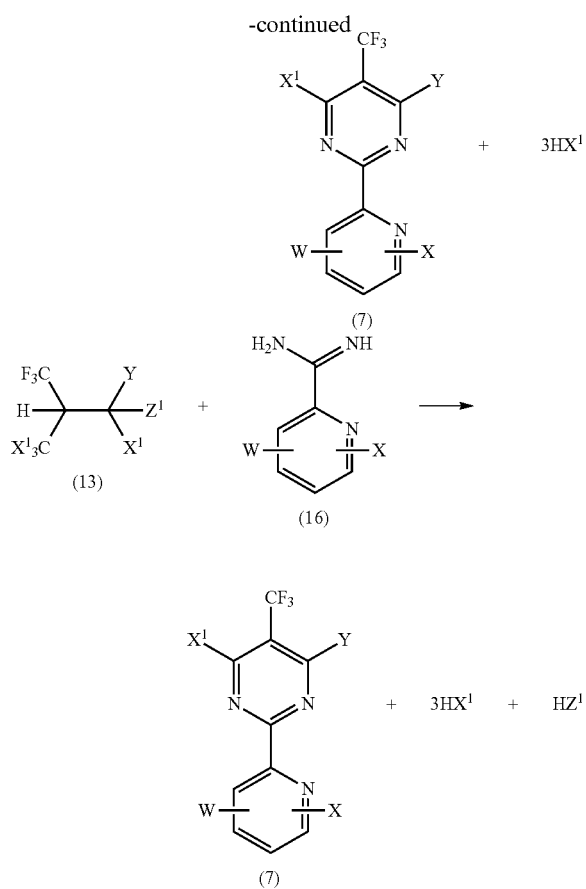

(7)

(13)

(16)

(7)

wherein W, X, Y and $X^1$ are as defined above, $Z^1$ represents a halogen atom, $-OA^1$, $-SO_pA^1$ (p is an integer of 0 to 3), or $-NA^1A^2$, and $A^1$ and $A^2$ each independently represent a hydrogen atom or a hydrocarbon group having 1 to 10 carbon atoms.

Further, the fluorine-containing pyrimidine compounds represented by the general formulas (9) to (11) may be obtained by substituting the halogen atom ($X^1$) located at the 6-position of the pyrimidine ring of the fluorine-containing pyrimidine compounds represented by the general formulas (5) to (7), respectively, with an amino group ($-NH_2$) through a reaction with ammonia as nucleophile as shown in the reaction formulas below. The reaction temperature during the reaction is preferably 20 to 150° C., and the reaction time is preferably 1 to 24 hours. A base such as triethylamine may also be used as a reaction aid.

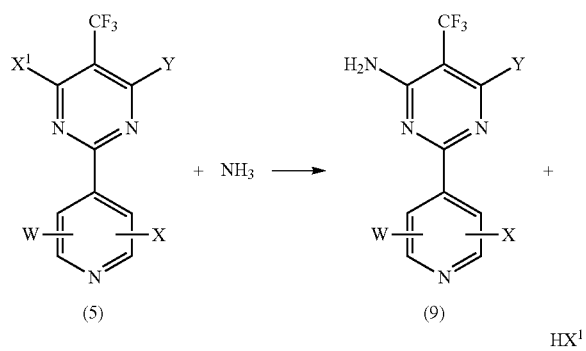

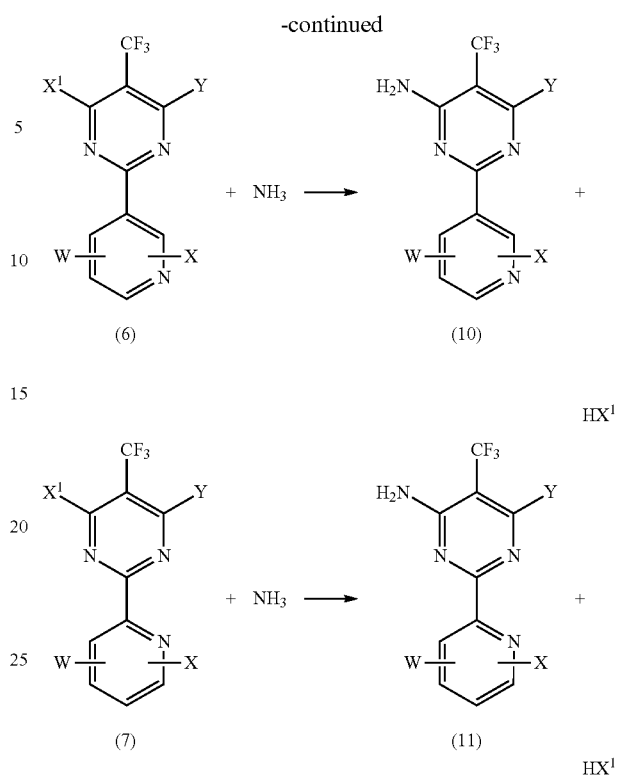

wherein W, X, Y, and $X^1$ are as defined above.

Examples of the organic solvents that may be used in the methods (a) to (f) include ethers such as tetrahydrofuran, diethyl ether, dioxane, monoglyme, diglyme, triglyme, and tetraglyme; aromatic hydrocarbons such as benzene, toluene, and xylene; nitriles such as acetonitrile; aprotic polar solvents such as dimethylformamide, dimethylacetamide, methylpyrrolidone, dimethylethyleneurea, tetramethylurea, dimethylsulfoxide and sulfolane.

Examples of basic substances that may be used in the methods (a) to (f) include alkali metal/alkaline earth metal hydroxides such as sodium hydroxide, potassium hydroxide, calcium hydroxide, lithium hydroxide, magnesium hydroxide and barium hydroxide; alkali metal/alkaline earth metal carbonates such as sodium carbonate, potassium carbonate, sodium hydrogen carbonate, and potassium hydrogen carbonate; metal hydrides such as sodium hydride, potassium hydride, and calcium hydride; and tertiary amines such as trimethylamine, triethylamine, diisopropylethylamine, diazabicycloundecene, and N,N-dimethylaniline.

The reaction temperature in the methods (a) to (f) is preferably −20° C. or more and less than the boiling point of the organic solvent, more preferably 25 to 100° C., and still more preferably 80 to 90° C. The reaction time in the methods (a) to (f) is preferably 0.5 to 48 hours, more preferably 1 to 36 hours, and still more preferably 20 to 25 hours.

Although the embodiments of the present disclosure have been described, the present disclosure is not limited to the embodiments described above, and includes all the aspects within the concept and claims of the present disclosure, allowing to be modified within the scope of the present disclosure.

EXAMPLES

Hereinafter, the present disclosure will be described in more detail with reference to Examples and the like, though the present disclosure is not limited by these Examples and the like.

Example 1

Production of 6-methoxy-N-phenyl-2-(2-pyridyl)-5-(trifluoromethyl)-4-pyrimidinamine In 6 ml of acetonitrile, 0.5 g (1.8 mmol) of 6-fluoro-4-methoxy-2-(2-pyridyl)-5-trifluoromethylpyrimidine was dissolved, and 0.2 g (2.4 mmol) of aniline and 0.4 g (4.1 mmol) of triethylamine were added thereto. The mixture was stirred with heating under reflux for 22.3 hours. After air-cooling to room temperature, water was added to the reaction solution, extraction with ethyl acetate was performed, and the organic phase was dried over sodium sulfate. The dried organic phase was filtered, and the filtrate was concentrated and subjected to column purification to obtain 0.3 g (1.0 mmol) of 6-methoxy-N-phenyl-2-(2-pyridyl)-5-(trifluoromethyl)-4-pyrimidineamine having the following structure. The yield was 52.2%.

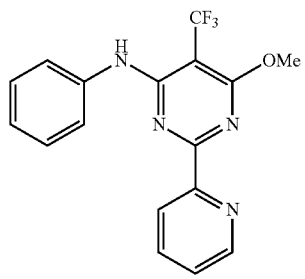 [SMILES: COc1nc(-c2ccccn2)nc(Nc2ccccc2)c1C(F)(F)F]

The analysis results were as follows.
$^1$H NMR (400 MHz, CDCl$_3$) δ ppm: 8.81-8.83 (m, 1H), 8.32 (d, J=8.0 Hz, 1H), 7.81 (ddd, J=7.6, 7.6, 1.2 Hz, 1H), 7.63 (d, J=7.6 Hz, 2H), 7.38-7.44 (m, 4H), 7.16-7.21 (m, 1H), 4.22 (s, 3H)
APCI-MS (m/z): 347.7 [M+H]$^+$

Example 2

Production of 6-methoxy-N-(3-methylphenyl)-2-(2-pyridyl)-5-(trifluoromethyl)-4-pyrimidinamine In 6 ml of acetonitrile, 0.5 g (1.8 mmol) of 6-fluoro-4-methoxy-2-(2-pyridyl)-5-trifluoromethylpyrimidine was dissolved, and 0.2 g (2.2 mmol) of m-toluidine and 0.4 g (4.1 mmol) of triethylamine were added thereto. The mixture was stirred with heating under reflux for 19.5 hours. After air-cooling to room temperature, water was added to the reaction solution, extraction with ethyl acetate was performed, and the organic phase was dried over sodium sulfate. The dried organic phase was filtered, and the filtrate was concentrated and then subjected to column purification to obtain 0.4 g (1.1 mmol) of 6-methoxy-N-(3-methylphenyl)-2-(2-pyridyl)-5-(trifluoromethyl)-4-pyrimidinamine having the following structure. The yield was 58.1%.

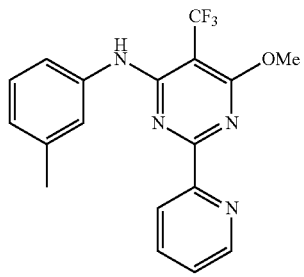 [SMILES: COc1nc(-c2ccccn2)nc(Nc2cccc(C)c2)c1C(F)(F)F]

The analysis results were as follows.
$^1$H NMR (400 MHz, CDCl$_3$) δ ppm: 8.81-8.83 (m, 1H), 8.32-8.35 (m, 1H), 7.78-7.83 (m, 1H), 7.45-7.48 (m, 2H), 7.35-7.41 (m, 2H), 6.98-7.02 (m, 1H), 4.22 (s, 3H), 2.41 (s, 3H)
APCI-MS (m/z): 361.6 [M+H]$^+$

Example 3

Production of N-(4-butylphenyl)-6-methoxy-2-(2-pyridyl)-5-(trifluoromethyl)-4-pyrimidinamine In 6 ml of acetonitrile, 0.5 g (1.8 mmol) of 6-fluoro-4-methoxy-2-(2-pyridyl)-5-trifluoromethylpyrimidine was dissolved, and 0.4 g (2.5 mmol) of 4-butylaniline and 0.4 g (4.4 mmol) of triethylamine were added thereto. The mixture was stirred with heating under reflux for 19.5 hours. After air-cooling to room temperature, water was added to the reaction solution, extraction with ethyl acetate was performed, and the organic phase was dried over sodium sulfate. The dried organic phase was filtered, and the filtrate was concentrated and then subjected to column purification to obtain 0.4 g (1.1 mmol) of N-(4-butylphenyl)-6-methoxy-2-(2-pyridyl)-5-(trifluoromethyl)-4-pyrimidinamine having the following structure. The yield was 59.4%.

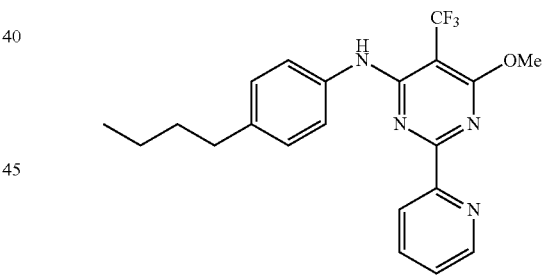

The analysis results were as follows.
$^1$H NMR (400 MHz, CDCl$_3$) δ ppm: 8.81 (ddd, J=4.6, 1.8, 0.9 Hz, 1H), 8.32 (ddd, J=8.0, 1.2, 1.2 Hz, 1H), 7.80 (ddd, J=8.0, 7.3, 1.8 Hz, 1H), 7.52 (d, J=8.3 Hz, 2H), 7.39 (ddd, J=7.6, 4.6, 1.2 Hz, 1H), 7.23-7.39 (m, 1H), 7.21 (d, J=8.3 Hz, 2H), 7.64 (d, J=7.6 Hz, 2H), 4.21 (s, 3H), 2.63 (t, J=7.6 Hz, 2H), 1.58-1.66 (m, 2H), 1.38 (tq, J=7.3, 7.3 Hz, 2H), 0.95 (t, J=7.3 Hz, 3H)
APCI-MS (m/z): 403.6 [M+H]$^+$

Example 4

Production of 6-methoxy-N-(3,4-dimethylphenyl)-2-(2-pyridyl)-5-(trifluoromethyl)-4-pyrimidinamine In 6 ml of acetonitrile, 0.5 g (1.9 mmol) of 6-fluoro-4-methoxy-2-(2-pyridyl)-5-trifluoromethylpyrimidine was dissolved, and 0.3 g (2.2 mmol) of 3,4-xylidine and 0.4 g (4.3 mmol) of triethylamine were added thereto. The mixture was stirred with heating under reflux for 28.6 hours. After air-cooling to room temperature, water was added to the reaction solution. The mixture was subjected to extraction with ethyl acetate, and the organic phase was dried over sodium sulfate. The dried organic phase was filtered, and the filtrate was concentrated and then subjected to column purification to obtain 0.5 g (1.3 mmol) of 6-methoxy-N-(3,4-dimethylphenyl)-2-(2-pyridyl)-5-(trifluoromethyl)-4-pyrimidinamine having the following structure. The yield was 68.0%.

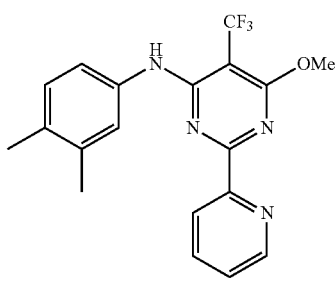 [SMILES: COc1nc(-c2ccccn2)nc(Nc2ccc(C)c(C)c2)c1C(F)(F)F]

The analysis results were as follows.
$^1$H NMR (400 MHz, CDCl$_3$) δ ppm: 8.81 (ddd, J=4.9, 1.8, 0.9 Hz, 1H), 8.31-8.34 (m, 1H), 7.80 (ddd, J=8.0, 7.6, 1.8 Hz, 1H), 7.36-7.40 (m, 3H), 7.30-7.35 (m, 1H), 7.16 (d, J=8.0, 1H), 4.21 (s, 3H), 2.31 (s, 3H), 2.28 (s, 3H)
APCI-MS (m/z): 375.5 [M+H]$^+$ Example 5

Production of N-(2-fluorophenyl)-6-methoxy-2-(2-pyridyl)-5-(trifluoromethyl)-4-pyrimidinamine In 6 ml of acetonitrile, 0.5 g (1.9 mmol) of 6-fluoro-4-methoxy-2-(2-pyridyl)-5-trifluoromethylpyrimidine was dissolved, and 0.3 g (2.5 mmol) of 2-fluoroaniline and 0.4 g (4.3 mmol) of triethylamine were added thereto. The mixture was stirred with heating under reflux for 28.6 hours. After air-cooling to room temperature, water was added to the reaction solution. The mixture was subjected to extraction with ethyl acetate, and the organic phase was dried over sodium sulfate. The dried organic phase was filtered, and the filtrate was concentrated and then subjected to column purification to obtain 0.1 g (0.2 mmol) of N-(2-fluorophenyl)-6-methoxy-2-(2-pyridyl)-5-(trifluoromethyl)-4-pyrimidinamine having the following structure. The yield was 10.4%.

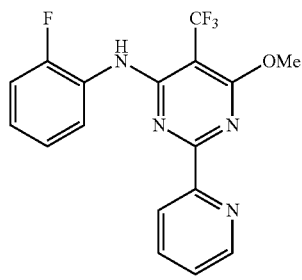 [SMILES: COc1nc(-c2ccccn2)nc(Nc2ccccc2F)c1C(F)(F)F]

The analysis results were as follows.
$^1$H NMR (400 MHz, CDCl$_3$) δ ppm: 8.83 (ddd, J=4.6, 1.8, 0.9 Hz, 1H), 8.47 (d, J=8.3, 8.0, 1.5 Hz, 1H), 8.32-8.35 (m, 1H), 7.83 (ddd, J=8.0, 7.6, 1.8 Hz, 1H), 7.67 (br, 1H), 7.41 (ddd, J=7.6, 4.9, 1.2 Hz, 1H), 7.20-7.26 (m, 1H), 7.08-7.19 (m, 2H), 4.22 (s, 3H)
APCI-MS (m/z): 365.6 [M+H]$^+$ Example 6

Production of N-(3-fluorophenyl)-6-methoxy-2-(2-pyridyl)-5-(trifluoromethyl)-4-pyrimidinamine In 6 ml of acetonitrile, 0.5 g (1.8 mmol) of 6-fluoro-4-methoxy-2-(2-pyridyl)-5-trifluoromethylpyrimidine was dissolved, and 0.3 g (2.3 mmol) of 3-fluoroaniline and 0.4 g (4.3 mmol) of triethylamine were added thereto. The mixture was stirred with heating under reflux for 28.6 hours. After air-cooling to room temperature, water was added to the reaction solution. The mixture was subjected to extraction with ethyl acetate, and the organic phase was dried over sodium sulfate. The dried organic phase was filtered, and the filtrate was concentrated and then subjected to column purification to obtain 0.2 g (0.5 mmol) of N-(3-fluorophenyl)-6-methoxy-2-(2-pyridyl)-5-(trifluoromethyl)-4-pyrimidinamine having the following structure. The yield was 26.1%

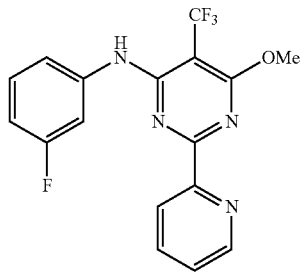 [SMILES: COc1nc(-c2ccccn2)nc(Nc2cccc(F)c2)c1C(F)(F)F]

The analysis results were as follows.
$^1$H NMR (400 MHz, CDCl$_3$) δ ppm: 8.84 (ddd, J=4.6, 1.8, 0.9 Hz, 1H), 8.34-8.37 (m, 1H), 7.84 (ddd, J=8.0, 7.6, 1.8 Hz, 1H), 7.77 (ddd, J=11.3, 2.5, 2.1 Hz, 1H), 7.43-7.49 (m, 1H), 7.42 (ddd, J=7.6, 4.9, 1.2 Hz, 1H), 7.32 (m, 1H), 7.24 (dd, J=8.2, 1.2 Hz, 1H), 6.87 (ddd, J=8.3, 2.5, 0.9 Hz, 1H), 4.22 (s, 3H)
APCI-MS (m/z): 365.5 [M+H]$^+$ Example 7

Production of N-(4-fluorophenyl)-6-methoxy-2-(2-pyridyl)-5-(trifluoromethyl)-4-pyrimidinamine In 6 ml of acetonitrile, 0.5 g (1.8 mmol) of 6-fluoro-4-methoxy-2-(2-pyridyl)-5-trifluoromethylpyrimidine was dissolved, and 0.3 g (2.3 mmol) of 4-fluoroaniline and 0.4 g (4.3 mmol) of triethylamine were added thereto. The mixture was stirred with heating under reflux for 28.6 hours. After air-cooling to room temperature, water was added to the reaction solution, the mixture was subjected to extraction with ethyl acetate, and the organic phase was dried over sodium sulfate. The dried organic phase was filtered, and the filtrate was concentrated and then subjected to column purification to obtain 0.2 g (0.5 mmol) of N-(4-fluorophenyl)-6-methoxy-2-(2-pyridyl)-5-(trifluoromethyl)-4-pyrimidinamine having the following structure. The yield was 26.1%.

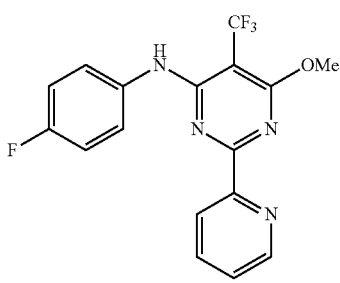 [SMILES: COc1nc(-c2ccccn2)nc(Nc2ccc(F)cc2)c1C(F)(F)F]

The analysis results were as follows.
<sup>1</sup>H NMR (400 MHz, CDCl<sub>3</sub>) δ ppm: 8.81 (ddd, J=4.9, 1.8, 0.9 Hz, 1H), 8.26 (ddd, J=8.0, 8.0, 0.9 Hz, 1H), 7.80 (ddd, J=7.6, 7.6, 1.8 Hz, 1H), 7.54-7.59 (m, 2H), 7.40 (ddd, J=7.6, 4.9, 1.2 Hz, 1H), 7.30-7.37 (m, 1H), 7.10 (dd, J=8.9, 8.6 Hz, 2H), 4.22 (s, 3H)
APCI-MS (m/z): 365.6 [M+H]$^+$

Example 8

Production of N-(2,6-dichloro-4-nitrophenyl)-6-methoxy-2-(2-pyridyl)-5-(trifluoromethyl)-4-pyrimidinamine In 6 ml of acetonitrile, 0.5 g (1.8 mmol) of 6-fluoro-4-methoxy-2-(2-pyridyl)-5-trifluoromethylpyrimidine was dissolved, and 0.5 g (2.2 mmol) of 2,6-dichloro-4-nitroaniline and 0.6 g (4.2 mmol) of DBU were added thereto. The mixture was stirred with heating under reflux for 22.3 hours. After air-cooling to room temperature, water was added to the reaction solution. The mixture was subjected to extraction with ethyl acetate, and the organic phase was dried over sodium sulfate. The dried organic phase was filtered, and the filtrate was concentrated and then subjected to column purification to obtain 0.06 g (0.1 mmol) of N-(2,6-dichloro-4-nitrophenyl)-6-methoxy-2-(2-pyridyl)-5-(trifluoromethyl)-4-pyrimidinamine having the following structure. The yield was 7.6%.

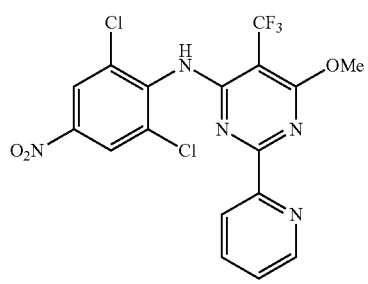 [SMILES: COc1nc(-c2ccccn2)nc(Nc2c(Cl)cc([N+](=O)[O-])cc2Cl)c1C(F)(F)F]

The analysis results were as follows.
<sup>1</sup>H NMR (400 MHz, CDCl<sub>3</sub>) δ ppm: 8.76-8.78 (m, 1H), 8.34 (s, 2H), 7.95 (d, J=8.0 Hz, 1H), 7.74 (ddd, J=8.0, 7.6, 1.5 Hz, 1H), 7.37 (ddd, J=7.8, 4.9, 1.4 Hz, 1H), 7.26 (br, 1H), 4.26 (s, 3H)
APCI-MS (m/z): 460.5 [M]$^+$

Example 9

Production of N-[2-nitro-4-(trifluoromethyl)phenyl]-6-methoxy-2-(2-pyridyl)-5-(trifluoromethyl)-4-pyrimidinamine In 6 ml of acetonitrile, 0.5 g (1.9 mmol) of 6-fluoro-4-methoxy-2-(2-pyridyl)-5-trifluoromethylpyrimidine was dissolved in, and 0.5 g (2.2 mmol) of 4-amino-3-nitrobenzotrifluoride and 0.4 g (4.1 mmol) of triethylamine were added thereto. The mixture was stirred with heating under reflux for 20.3 hours. After air-cooling to room temperature, water was added to the reaction solution. The mixture was subjected to extraction with ethyl acetate, and the organic phase was dried over sodium sulfate. The dried organic phase was filtered, and the filtrate was concentrated and then subjected to column purification to obtain 0.1 g (0.2 mmol) of N-[2-nitro-4-(trifluoromethyl)phenyl]-6-methoxy-2-(2-pyridyl)-5-(trifluoromethyl)-4-pyrimidinamine having the following structure. The yield was 12.6%.

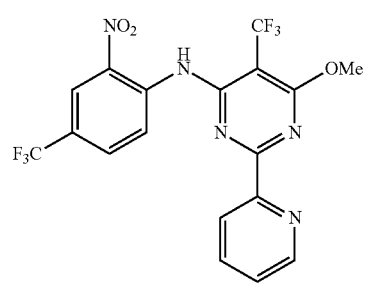 [SMILES: COc1nc(-c2ccccn2)nc(Nc2ccc(C(F)(F)F)cc2[N+](=O)[O-])c1C(F)(F)F]

The analysis results were as follows.
<sup>1</sup>H NMR (400 MHz, CDCl<sub>3</sub>) δ ppm: 10.95-11.01 (m, 1H), 9.22 (d, J=8.9 Hz, 1H), 8.85 (ddd, J=4.6, 1.8, 0.9 Hz, 1H), 8.53 (d, J=1.5 Hz, 1H), 8.39-8.42 (m, 1H), 7.93 (dd, J=9.2, 2.1 Hz, 1H), 7.89 (ddd, J=8.0, 7.6, 1.8 Hz, 1H), 7.47 (ddd, J=7.6, 4.9, 1.2 Hz, 1H), 4.25 (s, 3H)
APCI-MS (m/z): 460.7 [M+H]$^+$

Example 10

Production of N-(2,4-dinitrophenyl)-6-methoxy-2-(2-pyridyl)-5-(trifluoromethyl)-4-pyrimidinamine In 6 ml of acetonitrile, 0.5 g (1.8 mmol) of 6-fluoro-4-methoxy-2-(2-pyridyl)-5-trifluoromethylpyrimidine was dissolved, and 0.4 g (2.3 mmol) of 2,4-dinitroaniline and 0.5 g (4.7 mmol) of triethylamine were added thereto. The mixture was stirred with heating under reflux for 20.3 hours. After air-cooling to room temperature, water was added to the reaction solution. The mixture was subjected to extraction with ethyl acetate, and the organic phase was dried over sodium sulfate. The dried organic phase was filtered, and the filtrate was concentrated and then subjected to column purification to obtain 0.1 g (0.3 mmol) of N-(2,4-dinitrophenyl)-6-methoxy-2-(2-pyridyl)-5-(trifluoromethyl)-4-pyrimidinamine having the following structure. The yield was 16.8%.

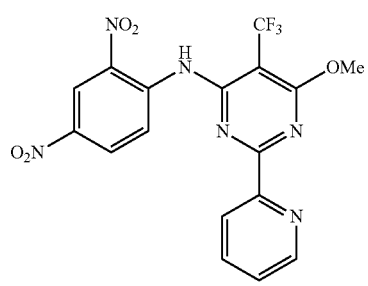 [SMILES: COc1nc(-c2ccccn2)nc(Nc2ccc([N+](=O)[O-])cc2[N+](=O)[O-])c1C(F)(F)F]

The analysis results were as follows.
¹H NMR (400 MHz, CDCl₃) δ ppm: 11.20-11.25 (m, 1H), 9.39 (d, J=9.5 Hz, 1H), 9.17 (d, J=2.5 Hz, 1H), 8.86 (ddd, J=4.9, 1.8, 0.9 Hz, 1H), 8.54 (dd, J=9.5, 2.8 Hz, 1H), 8.41-8.44 (m, 1H), 7.90 (ddd, J=8.0, 7.6, 1.8 Hz, 1H), 7.49 (ddd, J=7.6, 4.9, 1.2 Hz, 1H), 4.27 (s, 3H)
APCI-MS (m/z): 437.4 [M+H]⁺

Example 11

Production of N-[5-chloro-2-nitro-4-(trifluoromethyl)phenyl]-6-methoxy-2-(2-pyridyl)-5-(trifluoromethyl)-4-pyrimidinamine In 6 ml of acetonitrile, 0.5 g (1.9 mmol) of 6-fluoro-4-methoxy-2-(2-pyridyl)-5-trifluoromethylpyrimidine was dissolved, and 0.5 g (2.2 mmol) of 5-chloro-2-nitro-4-(trifluoromethyl)aniline and 0.4 g (4.4 mmol) of triethylamine were added thereto. The mixture was stirred with heating under reflux for 66.4 hours. After air-cooling to room temperature, water was added to the reaction solution. The mixture was subjected to extraction with ethyl acetate, and the organic phase was dried over sodium sulfate. The dried organic phase was filtered, and the filtrate was concentrated and then subjected to column purification to obtain 0.2 g (0.4 mmol) of N-[5-chloro-2-nitro-4-(trifluoromethyl)phenyl]-6-methoxy-2-(2-pyridyl)-5-(trifluoromethyl)-4-pyrimidinamine having the following structure. The yield was 20.6%.

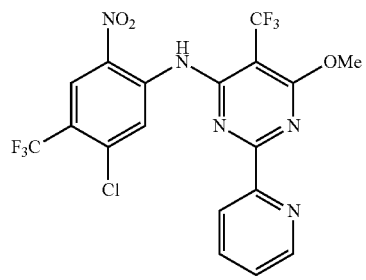 [SMILES: COc1nc(-c2ccccn2)nc(Nc2cc(Cl)c(C(F)(F)F)cc2[N+](=O)[O-])c1C(F)(F)F]

The analysis results were as follows.
¹H NMR (400 MHz, CDCl₃) δ ppm: 10.16-11.21 (m, 1H), 9.74 (s, 1H), 8.88 (ddd, J=4.6, 1.5, 0.9 Hz, 1H), 8.62 (s, 1H), 8.45 (ddd, J=8.0, 0.9, 0.9 Hz, 1H), 7.91 (ddd, J=7.6, 7.6, 1.5 Hz, 1H), 7.49 (ddd, J=7.6, 4.9, 1.2 Hz, 1H), 4.26 (s, 3H)
APCI-MS (m/z): 494.8 [M+H]⁺

Example 12

Production of 6-methoxy-N-(2,4-dimethylphenyl)-2-(2-pyridyl)-5-(trifluoromethyl)-4-pyrimidinamine In 6 ml of acetonitrile, 0.5 g (1.8 mmol) of 6-fluoro-4-methoxy-2-(2-pyridyl)-5-trifluoromethylpyrimidine was dissolved, and 0.3 g (2.3 mmol) of 2,4-dimethylaniline and 0.4 g (4.2 mmol) of triethylamine were added thereto. The mixture was stirred with heating under reflux for 25.4 hours. After air-cooling to room temperature, water was added to the reaction solution. The mixture was subjected to extraction with ethyl acetate, and the organic phase was dried over sodium sulfate. The dried organic phase was filtered, and the filtrate was concentrated and then subjected to column purification to obtain 0.1 g (0.3 mmol) of 6-methoxy-N-(2,4-dimethylphenyl)-2-(2-pyridyl)-5-(trifluoromethyl)-4-pyrimidinamine having the following structure. The yield was 14.1%.

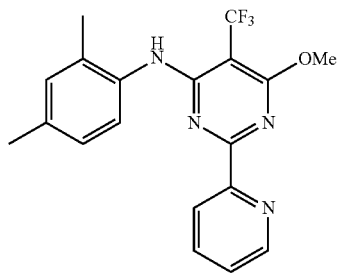 [SMILES: COc1nc(-c2ccccn2)nc(Nc2ccc(C)cc2C)c1C(F)(F)F]

The analysis results were as follows.
¹H NMR (400 MHz, CDCl₃) δ ppm: 8.78 (ddd, J=4.9, 1.8, 0.9 Hz, 1H), 8.16 (ddd, J=8.0, 8.0, 1.8 Hz, 1H), 7.75 (ddd, J=8.0, 1.2, 0.9 Hz, 1H), 7.59-7.61 (m, 2H), 7.36 (ddd, J=7.6, 4.9, 1.2 Hz, 1H), 7.12-7.17 (m, 1H), 7.12-7.06-7.11 (m, 2H), 4.22 (s, 3H), 2.36 (s, 3H), 2.24 (s, 3H)
APCI-MS (m/z): 375.8 [M+H]⁺

Example 13

Production of N-(4-chlorophenyl)-6-methoxy-2-(2-pyridyl)-5-(trifluoromethyl)-4-pyrimidinamine In 6 ml of acetonitrile, 0.5 g (1.8 mmol) of 6-fluoro-4-methoxy-2-(2-pyridyl)-5-trifluoromethylpyrimidine was dissolved, and 0.3 g (2.3 mmol) of 4-chloroaniline and 0.4 g (4.1 mmol) of triethylamine were added thereto. The mixture was stirred at room temperature for 18.6 hours, at 70° C. for 2.7 hours, and with heating under reflux for 19.6 hours. After air-cooling to room temperature, water was added to the reaction solution. The mixture was subjected to extraction with ethyl acetate, and the organic phase was dried over sodium sulfate. The dried organic phase was filtered, and the filtrate was concentrated and then subjected to column purification to obtain 0.3 g (0.8 mmol) of N-(4-chlorophenyl)-6-methoxy-2-(2-pyridyl)-5-(trifluoromethyl)-4-pyrimidinamine having the following structure. The yield was 43.8%.

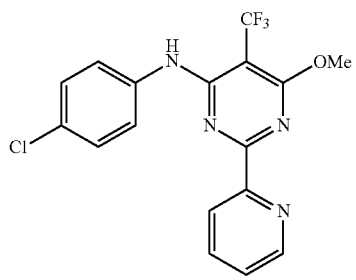 [SMILES: COc1nc(-c2ccccn2)nc(Nc2ccc(Cl)cc2)c1C(F)(F)F]

The analysis results were as follows.
¹H NMR (400 MHz, CDCl₃) δ ppm: 8.82 (ddd, J=4.6, 1.8, 0.9 Hz, 1H), 8.30 (ddd, J=8.0, 0.9, 0.9 Hz, 1H), 7.83 (ddd, J=8.0, 7.6, 1.8 Hz, 1H), 7.58-7.62 (m, 2H), 7.42 (ddd, J=7.6, 4.9, 1.2 Hz, 1H), 7.35-7.39 (m, 3H), 7.21 (d, J=8.3 Hz, 2H), 4.22 (s, 3H)
APCI-MS (m/z): 381.6 [M+H]⁺

Example 14

Production of N-(2,4-dichlorophenyl)-6-methoxy-2-(2-pyridyl)-5-(trifluoromethyl)-4-pyrimidinamine In 6 ml of acetonitrile, 0.5 g (1.8 mmol) of 6-fluoro-4-methoxy-2-(2-pyridyl)-5-trifluoromethylpyrimidine was dissolved, and 0.4 g (2.3 mmol) of 2,4-dichloroaniline and 0.4 g (6.9 mmol) of sodium hydride were added thereto. The mixture was stirred with heating under reflux for 19.2 hours. After air-cooling to room temperature, water was added to the reaction solution, and the mixture was subjected to extraction with ethyl acetate, and the organic phase was dried over sodium sulfate. The dried organic phase was filtered, and the filtrate was concentrated and then subjected to column purification to obtain 0.1 g (0.3 mmol) of N-(2,4-dichlorophenyl)-6-methoxy-2-(2-pyridyl)-5-(trifluoromethyl)-4-pyrimidinamine having the following structure. The yield was 17.1%.

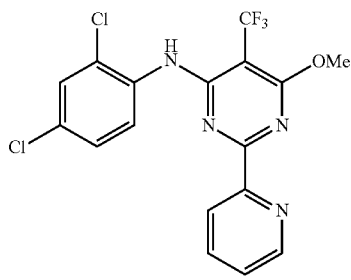 [SMILES: COc1nc(-c2ccccn2)nc(Nc2ccc(Cl)cc2Cl)c1C(F)(F)F]

The analysis results were as follows.

$^1$H NMR (400 MHz, CDCl$_3$) δ ppm: 8.83 (ddd, J=4.6, 1.8, 0.9 Hz, 1H), 8.58 (d, J=8.9 Hz, 1H), 8.32-8.35 (m, 1H), 7.95-8.01 (m, 1H), 7.85 (ddd, J=8.0, 7.6, 1.8 Hz, 1H), 7.42-7.45 (m, 2H), 7.35 (dd, J=8.9, 2.5 Hz, 1H), 4.22 (s, 3H)

APCI-MS (m/z): 416.5 [M+H]$^+$

Example 15

Production of 6-methoxy-N-(4-methylphenyl)-2-(2-pyridyl)-5-(trifluoromethyl)-4-pyrimidinamine In 6.1 ml of DMF, 0.24 g (2.22 mmol) of p-toluidine was dissolved, and 0.09 g (2.27 mmol) of sodium hydride was added thereto. After stirring at room temperature for 30 minutes, 0.50 g (1.83 mmol) of 6-fluoro-4-methoxy-2-(2-pyridyl)-5-trifluoromethylpyrimidine was added thereto, and the mixture was stirred at 100° C. for 18.8 hours. Water was added to the reaction solution. The mixture was subjected to extraction with ethyl acetate, and the organic phase was dried over sodium sulfate. The dried organic phase was filtered, and the filtrate was concentrated and then subjected to column purification to obtain 0.31 g (0.87 mmol) of 6-methoxy-N-(4-methylphenyl)-2-(2-pyridyl)-5-(trifluoromethyl)-4-pyrimidinamine having the following structure. The yield was 48%.

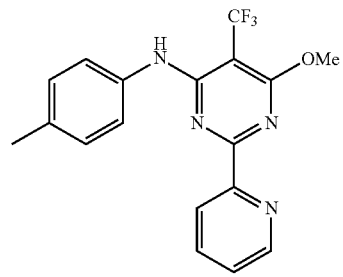 [SMILES: COc1nc(-c2ccccn2)nc(Nc2ccc(C)cc2)c1C(F)(F)F]

The analysis results were as follows.

$^1$H NMR (400 MHz, CDCl$_3$) δ ppm: 8.81 (m, 1H), 8.31 (d, J=8.0 Hz, 1H), 7.80 (ddd, J=7.6, 7.6, 1.8 Hz, 1H), 7.49 (d, J=8.2 Hz, 2H), 7.32-7.40 (m, 2H), 7.21 (d, J=8.3 Hz, 2H), 4.21 (s, 3H), 2.37 (s, 3H)

APCI-MS (m/z): 360.1 [M+H]$^+$

Example 16

Production of 6-chloro-N-phenyl-2-(2-pyridyl)-5-(trifluoromethyl)-4-pyrimidinamine In 2 ml of acetonitrile, 0.05 g (0.2 mmol) of 6-chloro-2-(2-pyridyl)-5-(trifluoromethyl)-4-pyrimidinamine was dissolved, and 0.02 g (0.2 mmol) of chlorobenzene and 0.01 g (0.3 mmol) of sodium hydride were added thereto. The mixture was stirred at 50° C. for 19.2 hours. After air-cooling to room temperature, water was added to the reaction solution. The mixture was subjected to extraction with ethyl acetate, and the organic phase was dried over sodium sulfate. The dried organic phase was filtered, and the filtrate was concentrated and subjected to column purification to obtain 0.01 g (0.02 mmol) of 6-chloro-N-phenyl-2-(2-pyridyl)-5-(trifluoromethyl)-4-pyrimidineamine having the following structure. The yield was 12.5%.

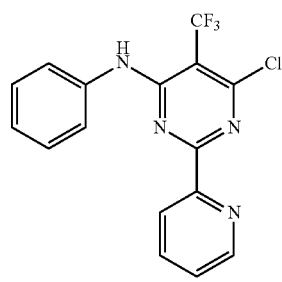 [SMILES: FC(F)(F)c1c(Cl)nc(-c2ccccn2)nc1Nc1ccccc1]

The analysis results were as follows.
APCI-MS (m/z): 451.7 [M+H]$^+$

Example 17

Production of 6-methoxy-N-phenyl-2-(4-pyridyl)-5-(trifluoromethyl)-4-pyrimidinamine In 5.0 ml of DMF, 0.04 g (0.39 mmol) of aniline was dissolved, and 0.02 g (0.58 mmol) of sodium hydride was added thereto. The mixture was stirred at room temperature for 1 hour. Then, 0.10 g (0.37 mmol) of 4-fluoro-6-methoxy-2-(4-pyridyl)-5-trifluoromethylpyrimidine was added thereto, and the mixture was stirred at room temperature for 16.7 hours, at 70° C. for 8 hours, and after further stirring at room temperature for 16 hours, the mixture was stirred at 70° C. for 8 hours and at 100° C. for 10.5 hours. After air-cooling to room temperature, water was added to the reaction solution. The mixture was subjected to extraction with ethyl acetate, and the organic phase was dried over sodium sulfate. The dried organic phase was filtered, and the filtrate was concentrated and subjected to column purification to obtain 0.03 g (0.08 mmol) of 6-methoxy-N-phenyl-2-(4-pyridyl)-5-(trifluoromethyl)-4-pyrimidineamine having the following structural formula. The yield was 22%.

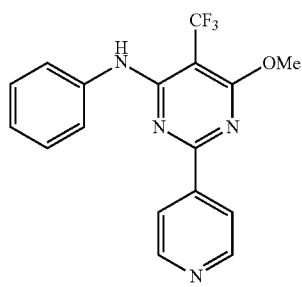 [SMILES: COc1nc(-c2ccncc2)nc(Nc2ccccc2)c1C(F)(F)F]

The analysis results were as follows.
$^1$H NMR (400 MHz, CDCl$_3$) δ ppm: 8.73 (m, 2H), 8.14 (dd, J=4.8, 1.6 Hz, 2H), 7.41-7.55 (m, 4H), 7.21-7.25 (m, 1H), 4.16 (s, 3H)
APCI-MS (m/z): 346.6 [M+H]$^+$ Example 18

Production of 6-methoxy-N-(4-methylphenyl)-2-(3-pyridyl)-5-(trifluoromethyl)-4-pyrimidinamine In 49.0 ml of DMF, 1.89 g (17.60 mmol) of p-toluidine was dissolved, and 0.72 g (17.98 mmol) of sodium hydride was added thereto. After stirring at room temperature for 30 minutes, 4.02 g (14.73 mmol) of 4-fluoro-6-methoxy-2-(3-pyridyl)-5-trifluoromethylpyrimidine was added thereto and stirred at 100° C. for 24 hours. Water was added to the reaction solution. The mixture was subjected to extraction with ethyl acetate, and the organic phase was dried over sodium sulfate. The dried organic phase was filtered, and the filtrate was concentrated and then subjected to column purification to obtain 0.71 g (1.98 mmol) of 6-methoxy-N-(4-methylphenyl)-2-(3-pyridyl)-5-(trifluoromethyl)-4-pyrimidinamine having the following structure. The yield was 13%.

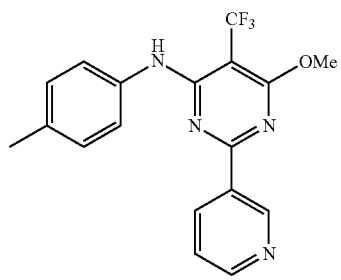 [SMILES: COc1nc(-c2cccnc2)nc(Nc2ccc(C)cc2)c1C(F)(F)F]

The analysis results were as follows.
$^1$H NMR (400 MHz, CDCl$_3$) δ ppm: 9.52 (m, 1H), 8.68 (dd, J=4.6, 1.2 Hz, 1H), 8.54 (ddd, J=8.0, 1.5, 1.5 Hz, 1H), 7.40 (d, J=8.3 Hz, 2H), 7.35 (dd, J=8.0, 4.9 Hz, 1H), 7.31 (br, 1H), 7.21 (d, J=8.3 Hz, 2H), 4.13 (s, 3H), 2.38 (s, 3H)
APCI-MS (m/z): 360.0 [M+H]$^+$ Example 19

Production of 6-methoxy-N-(4-methylphenyl)-2-(4-pyridyl)-5-(trifluoromethyl)-4-pyrimidinamine In 6.1 ml of DMF, 0.24 g (2.27 mmol) of p-toluidine was dissolved, and 0.09 g (2.30 mmol) of sodium hydride was added thereto. After stirring at room temperature for 30 minutes, 0.50 g (1.82 mmol) of 4-fluoro-6-methoxy-2-(4-pyridyl)-5-trifluoromethylpyrimidine was added thereto and stirred at 100° C. for 24 hours. Water was added to the reaction solution. The mixture was subjected to extraction with ethyl acetate, and the organic phase was dried over sodium sulfate. The dried organic phase was filtered, and the filtrate was concentrated and then subjected to column purification to obtain 0.24 g (0.65 mmol) of 6-methoxy-N-(4-methylphenyl)-2-(4-pyridyl)-5-(trifluoromethyl)-4-pyrimidinamine having the following structure. The yield was 36%.

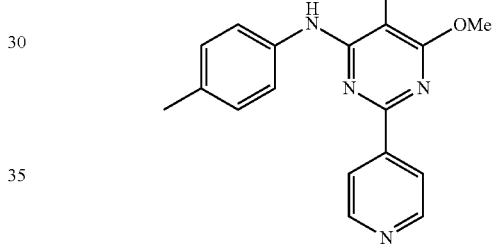

The analysis results were as follows.
$^1$H NMR (400 MHz, CDCl$_3$) δ ppm: 8.73 (dd, J=4.3, 1.4 Hz, 2H), 8.13 (dd, J=4.3, 1.8 Hz, 2H), 7.41 (d, J=8.3 Hz, 2H), 7.33 (br, 1H), 7.23 (d, J=8.3 Hz, 2H), 4.16 (s, 3H), 2.40 (s, 3H)
APCI-MS (m/z): 360.0 [M+H]$^+$ Example 20

Production of 6-chloro-N-(4-methylphenyl)-2-(4-pyridyl)-5-(trifluoromethyl)-4-pyrimidinamine In 1.1 ml of DMF, 0.04 g (0.36 mmol) of p-toluidine was dissolved, and 0.02 g (0.45 mmol) of sodium hydride was added thereto. After stirring at room temperature for 30 minutes, 0.10 g (0.34 mmol) of 4,6-dichloro-2-(4-pyridyl)-5-trifluoromethylpyrimidine was added thereto, and the mixture was stirred at room temperature for 18.3 hours. Water was added to the reaction solution. The mixture was subjected to extraction with ethyl acetate, and the organic phase was dried over sodium sulfate. The dried organic phase was filtered, and the filtrate was concentrated and then subjected to column purification to obtain 0.11 g (0.30 mmol) of 6-chloro-N-(4-methylphenyl)-2-(4-pyridyl)-5-(trifluoromethyl)-4-pyrimidinamine having the following structure. The yield was 89%.

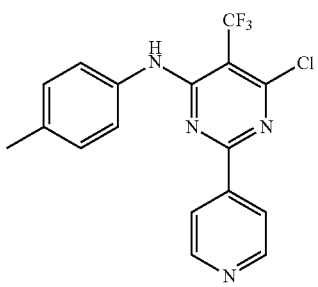 [SMILES: Cc1ccc(Nc2nc(-c3ccncc3)nc(Cl)c2C(F)(F)F)cc1]

The analysis results were as follows.
$^1$H NMR (400 MHz, CDCl$_3$) δ ppm: 8.74 (dd, J=4.6, 1.5 Hz, 2H), 8.10 (dd, J=4.3, 1.8 Hz, 2H), 7.51 (br, 1H), 7.39 (d, J=8.3 Hz, 2H), 7.27 (d, J=8.3 Hz, 2H), 2.42 (s, 3H)
APCI-MS (m/z): 365.1 [M+H]$^+$ Example 21

Production of 6-chloro-N-(4-methylphenyl)-2-(2-pyridyl)-5-(trifluoromethyl)-4-pyrimidinamine In 4.0 ml of DMF, 0.36 g (3.34 mmol) of p-toluidine was dissolved, and 0.17 g (4.25 mmol) of sodium hydride was added thereto. After stirring at room temperature for 30 minutes, 0.98 g (3.34 mmol) of 4,6-dichloro-2-(2-pyridyl)-5-trifluoromethylpyrimidine dissolved in 7.0 ml of DMF was added thereto and stirred at room temperature for 21.7 hours. Water was added to the reaction solution. The mixture was subjected to extraction with ethyl acetate, and the organic phase was dried over sodium sulfate. The dried organic phase was filtered, and the filtrate was concentrated and then subjected to column purification to obtain 0.89 g (2.44 mmol) of 6-chloro-N-(4-methylphenyl)-2-(2-pyridyl)-5-(trifluoromethyl)-4-pyrimidinamine having the following structure. The yield was 73%.

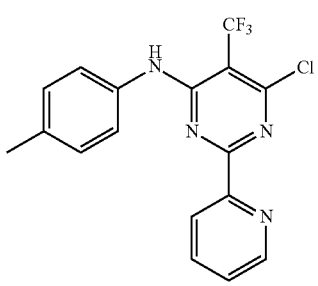 [SMILES: Cc1ccc(Nc2nc(-c3ccccn3)nc(Cl)c2C(F)(F)F)cc1]

The analysis results were as follows.
$^1$H NMR (400 MHz, CDCl$_3$) δ ppm: 8.84 (ddd, J=4.6, 1.8, 0.9 Hz, 1H), 8.24 (ddd, J=8.0, 0.9, 0.9 Hz, 1H), 7.80 (ddd, J=8.0, 7.6, 1.8 Hz, 1H), 7.52 (br, 1H), 7.45 (dd, J=8.3, 1.8, 1.8 Hz, 2H), 7.41 (ddd, J=7.6, 4.9, 1.2 Hz, 1H), 7.25 (d, J=9.2 Hz, 2H), 2.40 (s, 3H)
APCI-MS (m/z): 365.0 [M+H]$^+$ Example 22

Production of 6-chloro-N-(4-methylphenyl)-2-(3-pyridyl)-5-(trifluoromethyl)-4-pyrimidinamine In 2.0 ml of DMF, 0.23 g (2.17 mmol) of p-toluidine was dissolved, and 0.11 g (2.63 mmol) of sodium hydride was added thereto. After stirring at room temperature for 30 minutes, 0.63 g (2.16 mmol) of 4,6-dichloro-2-(3-pyridyl)-5-trifluoromethylpyrimidine dissolved in 8.0 ml of DMF was added thereto and stirred at room temperature for 21.5 hours. Water was added to the reaction solution. The mixture was subjected to extraction with ethyl acetate, and the organic phase was dried over sodium sulfate. The dried organic phase was filtered, and the filtrate was concentrated and then subjected to column purification to obtain 0.51 g (1.40 mmol) of 6-chloro-N-(4-methylphenyl)-2-(3-pyridyl)-5-(trifluoromethyl)-4-pyrimidinamine having the following structure. The yield was 65%.

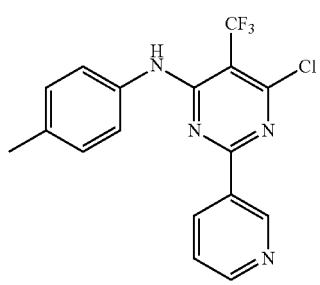 [SMILES: Cc1ccc(Nc2nc(-c3cccnc3)nc(Cl)c2C(F)(F)F)cc1]

The analysis results were as follows.
$^1$H NMR (400 MHz, CDCl$_3$) δ ppm: 9.45 (dd, J=2.1, 0.6 Hz, 1H), 8.72 (dd, J=4.9, 1.5 Hz, 1H), 8.56 (ddd, J=8.0, 2.1, 1.8 Hz, 1H), 7.49 (br, 1H), 7.36-7.40 (m, 3H), 7.25 (d, J=9.5 Hz, 2H), 2.40 (s, 3H)
APCI-MS (m/z): 365.1 [M+H]$^+$ Example 23

Production of 6-methoxy-N-(4-methylphenyl)-2-(6-n-propyl-2-pyridyl)-5-(trifluoromethyl)-4-pyrimidinamine In 2.0 ml of DMF, 0.4 g (3.3 mmol) of p-toluidine was dissolved, and 0.13 g (3.3 mmol) of sodium hydride was added thereto. After stirring at room temperature for 35 minutes, 0.9 g (2.7 mmol) of 4-fluoro-6-methoxy-2-(6-n-propyl-2-pyridyl)-5-trifluoromethylpyrimidine dissolved in 7.0 ml of DMF was added thereto and stirred at room temperature for 51.7 hours. Water was added to the reaction solution. The mixture was subjected to extraction with ethyl acetate, and the organic phase was dried over sodium sulfate. The dried organic phase was filtered, and the filtrate was concentrated and then subjected to column purification to obtain 0.7 g (1.7 mmol) of 6-methoxy-N-(4-methylphenyl)-2-(6-n-propyl-2-pyridyl)-5-(trifluoromethyl)-4-pyrimidinamine having the following structure. The yield was 61%.

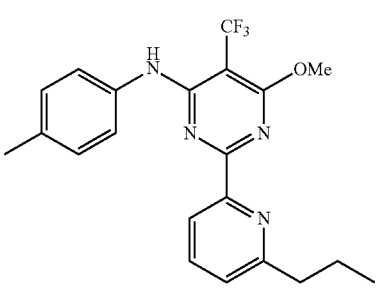 [SMILES: CCCc1cccc(-c2nc(Nc3ccc(C)cc3)c(C(F)(F)F)c(OC)n2)n1]

The analysis results were as follows.
¹H NMR (400 MHz, CDCl₃) δ ppm: 8.14 (d, J=7.6 Hz, 1H), 7.70 (dd, J=8.0, 7.6 Hz, 1H), 7.64 (d, J=8.6 Hz, 2H), 7.36 (br, 1H), 7.25 (d, J=8.3 Hz, 1H), 7.18 (d, J=8.3 Hz, 2H), 4.18 (s, 3H), 2.90 (t, J=7.6 Hz, 1H), 2.36 (s, 3H), 1.92 (tq, J=7.3, 7.3 Hz, 2H), 1.05 (t, J=7.3 Hz, 3H)
APCI-MS (m/z): 403.0 [M+H]⁺

Example 24

Production of 6-methoxy-2-(2-methoxy-5-pyridyl)-N-(4-methylphenyl)-5-(trifluoromethyl)-4-pyrimidinamine In 1.0 ml of DMF, 0.03 g (0.3 mmol) of p-toluidine was dissolved, and 0.02 g (0.6 mmol) of sodium hydride was added thereto. After stirring at room temperature for 30 minutes, 0.1 g (0.3 mmol) of 4-fluoro-6-methoxy-2-(2-methoxy-5-pyridyl)-5-trifluoromethylpyrimidine was added thereto and stirred at room temperature for 25 hours. Water was added to the reaction solution. The mixture was subjected to extraction with ethyl acetate, and the organic phase was dried over sodium sulfate. The dried organic phase was filtered, and the filtrate was concentrated and then subjected to column purification to obtain 0.002 g (0.005 mmol) of 6-methoxy-2-(2-methoxy-5-pyridyl)-N-(4-methylphenyl)-5-(trifluoromethyl)-4-pyrimidinamine having the following structure. The yield was 2%.

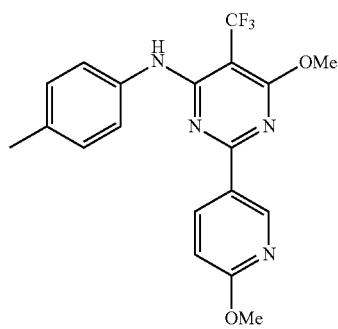 [SMILES: COc1ccc(-c2nc(Nc3ccc(C)cc3)c(C(F)(F)F)c(OC)n2)cn1]

The analysis results were as follows.
¹H NMR (400 MHz, CDCl₃) δ ppm: 9.14 (d, J=1.8 Hz, 1H), 8.44 (dd, J=2.5, 8.6 Hz, 1H), 7.40 (d, J=8.3 Hz, 2H), 7.26 (br, 1H), 7.21 (d, J=8.3 Hz, 1H), 6.78 (d, J=8.3 Hz, 2H), 4.11 (s, 3H), 4.00 (s, 3H), 2.38 (s, 3H)
APCI-MS (m/z): 390.5 [M]⁺

Example 25

Production of 6-methoxy-N-(4-methylphenyl)-5-(trifluoromethyl)-2-(2-trifluoromethyl-5-pyridyl)-4-pyrimidinamine In 5.0 ml of DMF, 0.04 g (0.4 mmol) of p-toluidine was dissolved, and 0.02 g (0.6 mmol) of sodium hydride was added thereto. After stirring at room temperature for 30 minutes, the mixture was cooled to 0° C., and 0.1 g (0.4 mmol) of 4-fluoro-6-methoxy-5-trifluoromethyl-2-(2-trifluoromethyl-5-pyridyl)pyrimidine was added thereto and stirred at room temperature for 26.8 hours. Water was added to the reaction solution. The mixture was subjected to extraction with ethyl acetate, and the organic phase was dried over sodium sulfate. The dried organic phase was filtered, and the filtrate was concentrated and subjected to column purification to obtain 0.001 g (0.002 mmol) of 6-methoxy-N-(4-methylphenyl)-5-(trifluoromethyl)-2-(2-trifluoromethyl-5-pyridyl)-4-pyrimidinamine having the following structure. The yield was 1%.

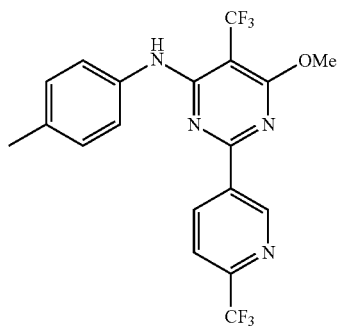 [SMILES: COc1nc(-c2ccc(C(F)(F)F)nc2)nc(Nc2ccc(C)cc2)c1C(F)(F)F]

The analysis results were as follows.
¹H NMR (400 MHz, CDCl₃) δ ppm: 9.59 (s, 1H), 8.72 (dd, J=8.3, 1.2 Hz, 1H), 7.75 (d, J=8.0 Hz, 1H), 7.36 (d, J=8.3 Hz, 2H), 7.34 (br, 1H), 7.22 (d, J=8.3 Hz, 2H), 4.15 (s, 3H), 2.39 (s, 3H)
APCI-MS (m/z): 428.4 [M]⁺

Example 26

Production of 6-methoxy-N-(4-methylphenyl)-2-(4-methylthio-2-pyridyl)-5-(trifluoromethyl)-4-pyrimidinamine In 1.0 ml of DMF, 0.02 g (0.1 mmol) of p-toluidine was dissolved, and 0.01 g (0.3 mmol) of sodium hydride was added. After stirring at room temperature for 30 minutes, the mixture was cooled to 0° C., and 0.05 g (0.1 mmol) of 4-fluoro-6-methoxy-2-(4-methylthio-2-pyridyl)-5-trifluoromethylpyrimidine dissolved in 2 ml of DMF was added thereto. The mixture was stirred at room temperature for 22.6 hours. Water was added to the reaction solution. The mixture was subjected to extraction with ethyl acetate, and the organic phase was dried over sodium sulfate. The dried organic phase was filtered, and the filtrate was concentrated and then subjected to column purification to obtain a trace amount of 6-methoxy-N-(4-methylphenyl)-2-(4-methylthio-2-pyridyl)-5-(trifluoromethyl)-4-pyrimidinamine having the following structure.

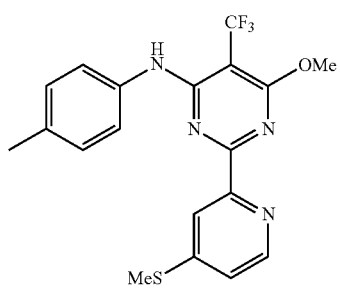 [SMILES: COc1nc(-c2cc(SC)ccn2)nc(Nc2ccc(C)cc2)c1C(F)(F)F]

The analysis results were as follows.
¹H NMR (400 MHz, CDCl₃) δ ppm: 8.56 (d, J=5.5 Hz, 1H), 8.14 (d, J=2.1, 1H), 7.46 (d, J=8.6 Hz, 2H), 7.32-7.54 (m, 1H), 7.18-7.21 (m, 3H), 4.22 (s, 3H), 2.48 (s, 3H), 2.37 (s, 3H)
APCI-MS (m/z): 406.3 [M]⁺

Example 27

Production of 2-(2-bromo-5-pyridyl)-6-methoxy-N-(4-methylphenyl)-5-(trifluoromethyl)-4-pyrimidinamine In 3.0 ml of DMF, 0.03 g (0.2 mmol) of p-toluidine was dissolved, and 0.01 g (0.4 mmol) of sodium hydride was added thereto. After stirring at room temperature for 30 minutes, the mixture was cooled to 0° C., and 0.09 g (0.3 mmol) of 2-(2-bromo-5-pyridyl)-4-fluoro-6-methoxy-5-trifluoromethylpyrimidine was added thereto. The mixture was stirred at room temperature for 22 hours. Water was added to the reaction solution. The mixture was subjected to extraction with ethyl acetate, and the organic phase was dried over sodium sulfate. The dried organic phase was filtered and the filtrate was concentrated and then subjected to column purification to obtain a trace amount of 2-(2-bromo-5-pyridyl)-6-methoxy-N-(4-methylphenyl)-5-(trifluoromethyl)-4-pyrimidinamine having the following structure.

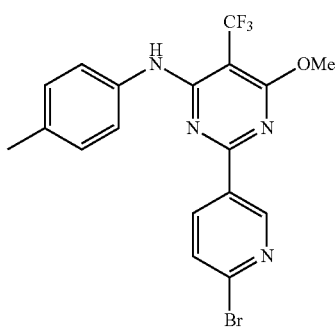 [SMILES: COc1nc(-c2ccc(Br)nc2)nc(Nc2ccc(C)cc2)c1C(F)(F)F]

The analysis results were as follows.
$^1$H NMR (400 MHz, CDCl$_3$) δ ppm: 9.23 (ddd, J=2.5, 0.6 Hz, 1H), 8.38 (dd, J=8.3, 2.5 Hz, 1H), 7.54 (dd, J=8.3, 0.6 Hz, 1H), 7.36 (d, J=11.0 Hz, 2H), 7.30-7.32 (m, 1H), 7.20 (d, J=8.0 Hz, 1H), 4.13 (s, 3H), 2.38 (s, 3H)
APCI-MS (m/z): 440.3 [M+H]$^+$

Example 28

Production of 2-(2-dimethylamino-4-pyridyl)-6-methoxy-N-(4-methylphenyl)-5-(trifluoromethyl)-4-pyrimidinamine In 3.0 ml of DMF, 0.03 g (0.3 mmol) of p-toluidine was dissolved, and 0.02 g (0.4 mmol) of sodium hydride was added thereto. After stirring at room temperature for 30 minutes, the mixture was cooled to 0° C., and 0.08 g (0.3 mmol) of 2-(2-dimethylamino-4-pyridyl)-4-fluoro-6-methoxy-5-trifluoromethylpyrimidine was added. The mixture was stirred at room temperature for 41.4 hours. Water was added to the reaction solution. The mixture was subjected to extraction with ethyl acetate, and the organic phase was dried over sodium sulfate. The dried organic phase was filtered, and the filtrate was concentrated and then subjected to column purification to obtain 0.008 g (0.02 mmol) of 2-(2-dimethylamino-4-pyridyl)-6-methoxy-N-(4-methylphenyl)-5-(trifluoromethyl)-4-pyrimidinamine having the following structure. The yield was 8%.

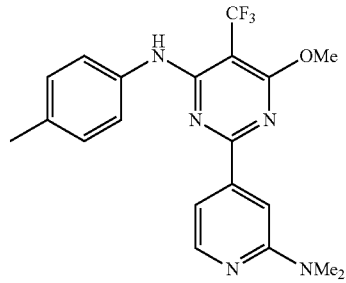 [SMILES: COc1nc(-c2ccnc(N(C)C)c2)nc(Nc2ccc(C)cc2)c1C(F)(F)F]

The analysis results were as follows.
$^1$H NMR (400 MHz, CDCl$_3$) δ ppm: 8.27 (d, J=5.5, 1H), 7.48 (s, 1H), 7.45 (d, J=8.3 Hz, 2H), 7.41 (dd, J=5.2, 1, 2 Hz, 1H), 7.30-7.32 (m, 1H), 7.19 (d, J=8.6 Hz, 2H), 4.40 (s, 3H), 3.14 (s, 6H), 2.37 (s, 3H)
APCI-MS (m/z): 403.3 [M]$^+$

Example 29

Production of methyl 2-[6-methoxy-4-[(4-methylphenyl)amino]-5-(trifluoromethyl)-2-pyrimidinyl]-4-pyridinecarboxylate In 6.0 ml of DMF, 0.07 g (0.6 mmol) of p-toluidine was dissolved, and 0.03 g (0.7 mmol) of sodium hydride was added thereto. After stirring at room temperature for 30 minutes, the mixture was cool to 10° C., and 0.2 g (0.6 mmol) of methyl 2-[4-fluoro-6-methoxy-5-trifluoromethyl)-2-pyrimidinyl]-4-pyridinecarboxylate was added thereto. The mixture was stirred at room temperature for 62.6 hours. Water was added to the reaction solution. The mixture was subjected to extraction with ethyl acetate, and the organic phase was dried over sodium sulfate. The dried organic phase was filtered, and the filtrate was concentrated and subjected to column purification to obtain 0.02 g (0.05 mmol) of methyl 2-[6-methoxy-4-[(4-methylphenyl)amino]-5-(trifluoromethyl)-2-pyrimidinyl]-4-pyridinecarboxylate having the following structure. The yield was 8%.

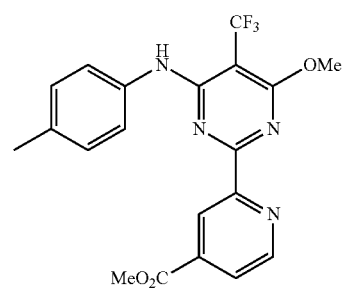 [SMILES: COC(=O)c1ccnc(-c2nc(Nc3ccc(C)cc3)c(C(F)(F)F)c(OC)n2)c1]

The analysis results were as follows.
$^1$H NMR (400 MHz, CDCl$_3$) δ ppm: 8.96 (dd, J=4.9, 0.9 Hz, 1H), 8.87 (dd, J=1.5, 0.9, 1H), 7.94 (dd, J=4.9, 1.5 Hz, 1H), 7.53 (d, J=8.3 Hz, 2H), 7.38-7.41 (m, 1H), 7.23 (d, J=8.3 Hz, 2H), 4.22 (s, 3H), 4.00 (s, 3H), 2.38 (s, 3H)
APCI-MS (m/z): 418.6 [M]$^+$

Example 30

Production of 6-methoxy-N-(4-methylphenyl)-2-(3-methyl-2-pyridyl)-5-(trifluoromethyl)-4-pyrimidinamine In 1.0 ml of DMF, 0.02 g (0.2 mmol) of p-toluidine was dissolved, and 0.02 g (0.4 mmol) of sodium hydride was added thereto. After stirring at room temperature for 30 minutes, the mixture was cooled to 0° C., and 0.05 g of a crude product of 4-fluoro-6-methoxy-2-(3-methyl-2-pyridyl)-5-trifluoromethylpyrimidine dissolved in 2.0 ml of DMF was added and stirred at room temperature for 17.1 hours. Water was added to the reaction solution. The mixture was subjected to extraction with ethyl acetate, and the organic phase was dried over sodium sulfate. The dried organic phase was filtered and the filtrate was concentrated and then subjected to column purification to obtain a trace amount of 6-methoxy-N-(4-methylphenyl)-2-(3-methyl-2-pyridyl)-5-(trifluoromethyl)-4-pyrimidinamine having the following structure.

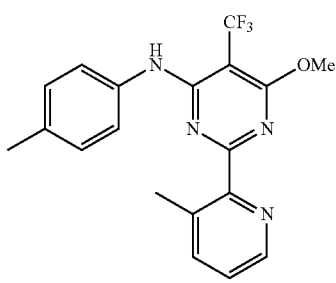 [SMILES: COc1nc(-c2ncccc2C)nc(Nc2ccc(C)cc2)c1C(F)(F)F]

The analysis results were as follows.
APCI-MS (m/z): 374.3 [M]+

Example 31

Production of 6-methoxy-N-(4-methylphenyl)-2-(5-methyl-2-pyridyl)-5-(trifluoromethyl)-4-pyrimidinamine In 6.0 ml of DMF, 0.09 g (0.8 mmol) of p-toluidine was dissolved, and 0.03 g (0.9 mmol) of sodium hydride was added thereto. After stirring at room temperature for 30 minutes, the mixture was cooled to 0° C., and 0.2 g (0.7 mmol) of 6-fluoro-4-methoxy-2-(5-methyl-2-pyridyl)-5-trifluoromethylpyrimidine was added and stirred at room temperature for 64 hours. Water was added to the reaction solution. The mixture was subjected to extraction with ethyl acetate, and the organic phase was dried over sodium sulfate. The dried organic phase was filtered, and the filtrate was concentrated and then subjected to column purification to obtain 0.07 g (0.18 mmol) of 6-methoxy-N-(4-methylphenyl)-2-(5-methyl-2-pyridyl)-5-(trifluoromethyl)-4-pyrimidinamine having the following structure. The yield was 26%.

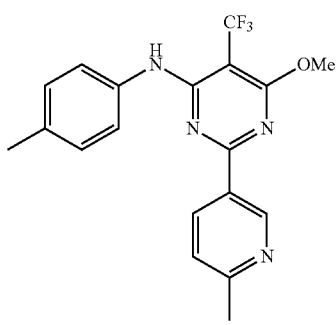 [SMILES: COc1nc(-c2ccc(C)nc2)nc(Nc2ccc(C)cc2)c1C(F)(F)F]

The analysis results were as follows.
$^1$H NMR (400 MHz, CDCl$_3$) δ ppm: 8.63 (m, 1H), 8.20 (d, J=8.0, 1H), 7.58-7.61 (m, 1H), 7.49 (d, J=8.3 Hz, 2H), 7.33 (br, 1H), 7.20 (d, J=8.3 Hz, 2H), 4.21 (s, 3H), 2.41 (s, 3H), 2.37 (s, 3H)
APCI-MS (m/z): 374.8 [M]+

Example 32

Production of 6-chloro-N-(4-methylphenyl)-2-(6-n-propyl-2-pyridyl)-5-(trifluoromethyl)-4-pyrimidinamine In 3.0 ml of DMF, 0.04 g (0.3 mmol) of p-toluidine was dissolved, and 0.02 g (0.2 mmol) of sodium hydride was added thereto. After stirring at room temperature for 30 minutes, the mixture was cooled to 0° C., and 0.1 g (0.3 mmol) of 4,6-dichloro-2-(6-n-propyl-2-pyridyl)-5-trifluoromethylpyrimidine was added and stirred at room temperature for 15.8 hours. Water was added to the reaction solution. The mixture was subjected to extraction with ethyl acetate, and the organic phase was dried over sodium sulfate. The dried organic phase was filtered, and the filtrate was concentrated and then subjected to column purification to obtain 0.09 g (0.2 mmol) of 6-chloro-N-(4-methylphenyl)-2-(6-n-propyl-2-pyridyl)-5-(trifluoromethyl)-4-pyrimidinamine having the following structure. The yield was 26%.

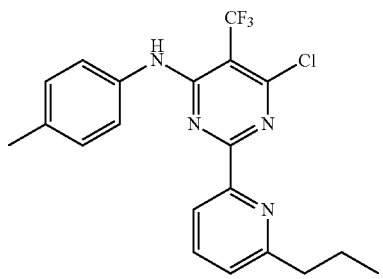 [SMILES: CCCc1cccc(-c2nc(Cl)c(C(F)(F)F)c(Nc3ccc(C)cc3)n2)n1]

The analysis results were as follows.
$^1$H NMR (400 MHz, CDCl$_3$) δ ppm: 8.11 (dd, J=8.0, 0.9 Hz, 1H), 7.71 (dd, J=8.0, 7.6 Hz, 1H), 7.59 (d, J=8.3 Hz, 2H), 7.53 (br, 1H), 7.28 (dd, J=7.6, 0.9 Hz, 1H), 7.22 (d, J=8.0 Hz, 2H), 2.92 (t, J=8.1 Hz, 2H), 2.38 (s, 3H), 1.88 (tq, J=7.6, 7.3 Hz, 2H), 1.03 (t, J=7.3 Hz, 3H)
APCI-MS (m/z): 406.9 [M]+

Example 33

Production of 6-chloro-N-[2,4-dinitro-6-(trifluoromethyl)phenyl]-2-(2-pyridyl)-5-(trifluoromethyl)-4-pyrimidinamine In 1.2 ml of acetonitrile, 0.1 g (0.4 mmol) of 6-chloro-2-(2-pyridyl)-5-(trifluoromethyl)-4-pyrimidinamine was dissolved, and 0.1 g (1.0 mmol) of triethylamine was added thereto. After stirring at room temperature for 1.1 hours, 0.2 g (0.6 mmol) of 2-chloro-3,5-dinitrobenzotrifluoride was added and stirred at room temperature for 16.8 hours. The reaction solution was subjected to column purification to obtain a trace amount of 6-chloro-N-[2,4-dinitro-6-(trifluoromethyl)phenyl]-2-(2-pyridyl)-5-(trifluoromethyl)-4-pyrimidinamine having the following structure.

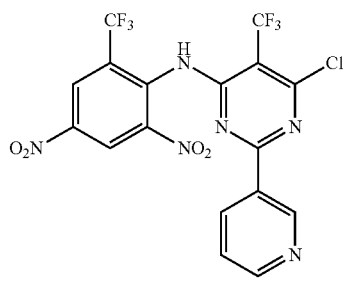 [SMILES: O=[N+]([O-])c1cc([N+](=O)[O-])c(Nc2nc(-c3cccnc3)nc(Cl)c2C(F)(F)F)c(C(F)(F)F)c1]

The analysis results were as follows.
APCI-MS (m/z): 509.2 [M]+

Example 34

Production of 6-chloro-N-(3-methylphenyl)-2-(2-pyridyl)-5-(trifluoromethyl)-4-pyrimidinamine In 1.1 ml of acetonitrile, 0.1 g (0.3 mmol) of 4,6-dichloro-2-(2-pyridyl)-5-trifluoromethylpyrimidine was dissolved, and 0.05 g (0.5 mmol) of m-toluidine and 0.08 g (0.8 mmol) of triethylamine were add and stirred at room temperature for 16.8 hours. Water was added to the reaction solution. The mixture was subjected to extraction with ethyl acetate, and the organic phase was dried over sodium sulfate. The dried organic phase was filtered, and the filtrate was concentrated and then subjected to column purification to quantitatively obtain 0.1 g (0.4 mmol) of 6-chloro-N-(3-methylphenyl)-2-(2-pyridyl)-5-(trifluoromethyl)-4-pyrimidinamine having the following structure.

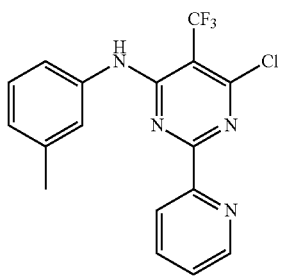 [SMILES: Cc1cccc(Nc2nc(-c3ccccn3)nc(Cl)c2C(F)(F)F)c1]

The analysis results were as follows.
$^1$H NMR (400 MHz, CDCl$_3$) δ ppm: 8.85 (ddd, J=4.9, 1.8, 0.9 Hz, 1H), 8.27 (ddd, J=8.0, 0.9, 0.9 Hz, 1H), 7.81 (ddd, J=7.6, 7.6, 1.5 Hz, 1H), 7.51-7.58 (m, 1H), 7.39-7.45 (m, 3H), 7.34 (t, J=8.0 Hz, 1H), 7.34 (d, J=7.3 Hz, 1H), 2.42 (s, 3H)
APCI-MS (m/z): 365.7 [M+H]+

Example 35

Production of N-(4-butylphenyl)-6-chloro-2-(2-pyridyl)-5-(trifluoromethyl)-4-pyrimidinamine In 1.1 ml of acetonitrile, 0.1 g (0.4 mmol) of 4,6-dichloro-2-(2-pyridyl)-5-trifluoromethylpyrimidine was dissolved, and 0.07 g (0.4 mmol) of 4-butylaniline and 0.08 g (0.8 mmol) of triethylamine were added thereto. The mixture was stirred at room temperature for 24 hours. Water was added to the reaction solution. The mixture was subjected to extraction with ethyl acetate, and the organic phase was dried over sodium sulfate. The dried organic phase was filtered, and the filtrate was concentrated and then subjected to column purification to obtain 0.1 g (0.3 mmol) of N-(4-butylphenyl)-6-chloro-2-(2-pyridyl)-5-(trifluoromethyl)-4-pyrimidinamine having the following structure. The yield was 92.3%.

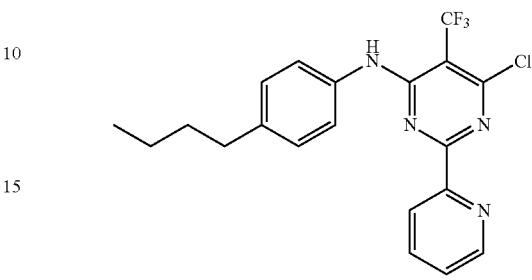

The analysis results were as follows.
$^1$H NMR (400 MHz, CDCl$_3$) δ ppm: 8.85 (ddd, J=4.6, 1.8, 0.9 Hz, 1H), 8.25 (ddd, J=8.0, 1.2, 0.9 Hz, 1H), 7.80 (ddd, J=8.0, 8.0, 1.8 Hz, 1H), 7.50-7.56 (m, 1H), 7.45-7.50 (m, 2H), 7.41 (ddd, J=7.6, 4.9, 1.2 Hz, 1H), 7.24-7.27 (m, 2H), 2.66 (dd, J=7.6, 7.6 Hz, 2H), 1.64 (m, 2H), 1.39 (tq, J=7.6, 7.3 Hz, 2H), 0.95 (t, J=7.3 Hz, 3H)
APCI-MS (m/z): 407.8 [M+H]+

Example 36

Production of 6-chloro-N-(3,4-dimethylphenyl)-2-(2-pyridyl)-5-(trifluoromethyl)-4-pyrimidinamine In 1.1 ml of acetonitrile, 0.1 g (0.4 mmol) of 4,6-dichloro-2-(2-pyridyl)-5-trifluoromethylpyrimidine was dissolved, and 0.05 g (0.4 mmol) of 3,4-xylidine and 0.09 g (0.9 mmol) of triethylamine were added thereto. The mixture was stirred at room temperature for 24.3 hours. Water was added to the reaction solution. The mixture was subjected to extraction with ethyl acetate, and the organic phase was dried over sodium sulfate. The dried organic phase was filtered, and the filtrate was concentrated and then subjected to column purification to obtain 0.1 g (0.3 mmol) of 6-chloro-N-(3,4-dimethylphenyl)-2-(2-pyridyl)-5-(trifluoromethyl)-4-pyrimidinamine having the following structure. The yield was 82.8%.

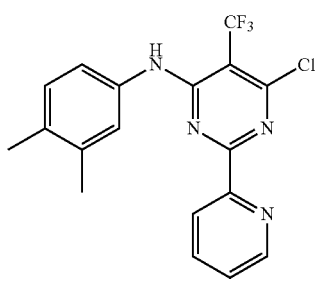 [SMILES: Cc1ccc(Nc2nc(-c3ccccn3)nc(Cl)c2C(F)(F)F)cc1C]

The analysis results were as follows.
$^1$H NMR (400 MHz, CDCl$_3$) δ ppm: 8.85 (ddd, J=4.9, 1.8, 0.9 Hz, 1H), 8.27 (ddd, J=8.0, 1.2, 0.9 Hz, 1H), 7.80 (ddd, J=8.0, 7.6, 1.8 Hz, 1H), 7.46-7.53 (m, 1H), 7.41 (ddd, J=7.6, 4.9, 1.2 Hz, 1H), 7.33-7.36 (m, 2H), 7.18-7.22 (m, 2H), 2.32 (s, 3H), 2.30 (s, 3H)
APCI-MS (m/z): 379.9 [M+H]+

Example 37

Production of 6-chloro-N-(2-fluorophenyl)-2-(2-pyridyl)-5-(trifluoromethyl)-4-pyrimidinamine In 1.1 ml of acetonitrile, 0.1 g (0.4 mmol) of 4,6-dichloro-2-(2-pyridyl)-5-trifluoromethylpyrimidine was dissolved, and 0.06 g (0.5 mmol) of 2-fluoroaniline and 0.08 g (0.8 mmol) of triethylamine were added thereto. The mixture was stirred at room temperature for 22.6 hours. Water was added to the reaction solution. The mixture was subjected to extraction with ethyl acetate, and the organic phase was dried over sodium sulfate. The dried organic phase was filtered, and the filtrate was concentrated and then subjected to column purification to obtain 0.006 g (0.02 mmol) of 6-chloro-N-(2-fluorophenyl)-2-(2-pyridyl)-5-(trifluoromethyl)-4-pyrimidinamine having the following structure. The yield was 4.4%.

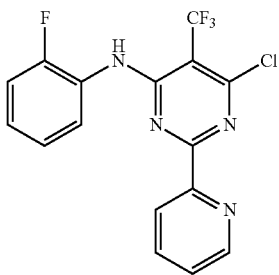 [SMILES: Fc1ccccc1Nc1nc(-c2ccccn2)nc(Cl)c1C(F)(F)F]

The analysis results were as follows.

$^1$H NMR (400 MHz, CDCl$_3$) δ ppm: 8.86 (ddd, J=4.6, 1.8, 0.9 Hz, 1H), 8.24-8.29 (m, 2H), 7.83 (ddd, J=8.0, 7.6, 1.8 Hz, 1H), 7.73-7.82 (m, 1H), 7.44 (ddd, J=7.6, 4.9, 1.2 Hz, 1H), 7.18-7.30 (m, 3H)

APCI-MS (m/z): 369.8 [M+H]$^+$

Example 38

Production of 6-chloro-N-(3-fluorophenyl)-2-(2-pyridyl)-5-(trifluoromethyl)-4-pyrimidinamine In 1.1 ml of acetonitrile, 0.1 g (0.3 mmol) of 4,6-dichloro-2-(2-pyridyl)-5-trifluoromethylpyrimidine was dissolved, and 0.06 g (0.5 mmol) of 3-fluoroaniline and 0.09 g (0.9 mmol) of triethylamine were added thereto. The mixture was stirred at room temperature for 17 hours. Water was added to the reaction solution. The mixture was subjected to extraction with ethyl acetate, and the organic phase was dried over sodium sulfate. The dried organic phase was filtered, and the filtrate was concentrated and then subjected to column purification to obtain 0.08 g (0.2 mmol) of 6-chloro-N-(3-fluorophenyl)-2-(2-pyridyl)-5-(trifluoromethyl)-4-pyrimidinamine having the following structure. The yield was 66.2%.

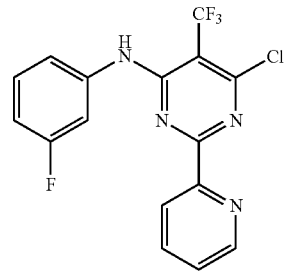 [SMILES: Fc1cccc(Nc2nc(-c3ccccn3)nc(Cl)c2C(F)(F)F)c1]

The analysis results were as follows.

$^1$H NMR (400 MHz, CDCl$_3$) δ ppm: 8.87 (ddd, J=4.6, 1.8, 0.9 Hz, 1H), 8.31 (ddd, J=8.0, 1.2, 0.9 Hz, 1H), 7.85 (ddd, J=8.0, 7.6, 1.8 Hz, 1H), 7.66 (ddd, J=10.7, 2.5, 2.1 Hz, 1H), 7.57-7.65 (m, 2H), 7.45 (ddd, J=7.3, 4.9, 1.2 Hz, 1H), 7.39 (ddd, J=8.3, 8.3, 6.4 Hz, 1H), 7.23-7.26 (m, 1H), 7.69 (ddd, J=8.3, 2.5, 0.9 Hz, 1H)

APCI-MS (m/z): 369.9 [M+H]$^+$

Example 39

Production of 6-chloro-N-(4-fluorophenyl)-2-(2-pyridyl)-5-(trifluoromethyl)-4-pyrimidinamine In 1.1 ml of acetonitrile, 0.1 g (0.3 mmol) of 4,6-dichloro-2-(2-pyridyl)-5-trifluoromethylpyrimidine was dissolved, and 0.05 g (0.4 mmol) of 4-fluoroaniline and 0.08 g (0.7 mmol) of triethylamine were added thereto. The mixture was stirred at room temperature for 16.3 hours. Water was added to the reaction solution. The mixture was subjected to extraction with ethyl acetate, and the organic phase was dried over sodium sulfate. The dried organic phase was filtered, and the filtrate was concentrated and then subjected to column purification to obtain 0.1 g (0.3 mmol) of 6-chloro-N-(4-fluorophenyl)-2-(2-pyridyl)-5-(trifluoromethyl)-4-pyrimidinamine having the following structure. The yield was 99.9%.

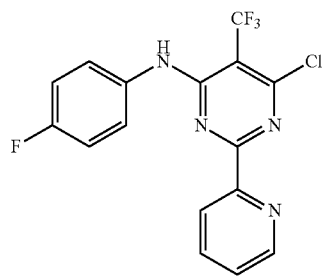 [SMILES: Fc1ccc(Nc2nc(-c3ccccn3)nc(Cl)c2C(F)(F)F)cc1]

The analysis results were as follows.

$^1$H NMR (400 MHz, CDCl$_3$) δ ppm: 8.84 (ddd, J=4.9, 1.8, 0.9 Hz, 1H), 8.19 (ddd, J=8.0, 0.9, 0.9 Hz, 1H), 7.81 (ddd, J=7.6, 7.6, 1.8 Hz, 1H), 7.48-7.56 (m, 3H), 7.42 (ddd, J=7.6, 4.9, 1.2 Hz, 1H), 7.13-7.17 (m, 2H)

APCI-MS (m/z): 370.0 [M+H]$^+$

Example 40

Production of 6-chloro-N-(2,6-dichloro-4-nitrophenyl)-2-(2-pyridyl)-5-(trifluoromethyl)-4-pyrimidinamine In 1.1 ml of acetonitrile, 0.1 g (0.4 mmol) of 4,6-dichloro-2-(2-pyridyl)-5-trifluoromethylpyrimidine was dissolved, and 0.09 g (0.4 mmol) of 2,6-dichloro-4-nitroaniline and 0.03 g (0.7 mmol) of sodium hydride were added thereto. The mixture was stirred at room temperature for 22.5 hours. After air-cooling to room temperature, water was added to the reaction solution. The mixture was subjected to extraction with ethyl acetate, and the organic phase was dried over sodium sulfate. The dried organic phase was filtered, and the filtrate was concentrated and subjected to column purification to obtain 0.004 g of a crude product of 6-chloro-N-(2,6-dichloro-4-nitrophenyl)-2-(2-pyridyl)-5-(trifluoromethyl)-4-pyrimidinamine having the following structure.

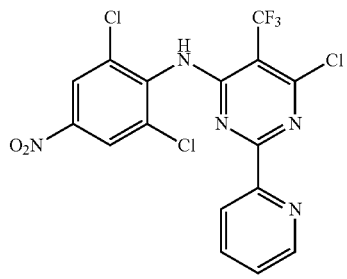 [SMILES: O=[N+]([O-])c1cc(Cl)c(Nc2nc(-c3ccccn3)nc(Cl)c2C(F)(F)F)c(Cl)c1]

The analysis results were as follows.
$^1$H NMR (400 MHz, CDCl$_3$) δ ppm: 8.82 (ddd, J=4.6, 1.5, 0.6 Hz, 1H), 8.38 (s, 2H), 7.89 (ddd, J=8.0, 0.9, 0.9 Hz, 1H), 7.76 (ddd, J=7.6, 7.6, 1.8 Hz, 1H), 7.43-7.37 (br, 1H), 7.41 (ddd, J=7.3, 4.6, 1.2 Hz, 1H)
APCI-MS (m/z): 465.1 [M]$^+$ Example 41

Production of 6-chloro-N-[2-nitro-4-(trifluoromethyl)phenyl]-2-(2-pyridyl)-5-(trifluoromethyl)-4-pyrimidinamine In 1.1 ml of acetonitrile, 0.1 g (0.3 mmol) of 4,6-dichloro-2-(2-pyridyl)-5-trifluoromethylpyrimidine was dissolved, and 0.09 g (0.4 mmol) of 4-amino-3-nitrobenzotrifluoride and 0.04 g (0.9 mmol) of sodium hydride were added thereto. The mixture was stirred at room temperature for 16.7 hours. Water was added to the reaction solution. The mixture was subjected to extraction with ethyl acetate, and the organic phase was dried over sodium sulfate. The dried organic phase was filtered, and the filtrate was concentrated and then subjected to column purification to obtain 0.1 g of a crude product of 6-chloro-N-[2-nitro-4-(trifluoromethyl)phenyl]-2-(2-pyridyl)-5-(trifluoromethyl)-4-pyrimidinamine having the following structure.

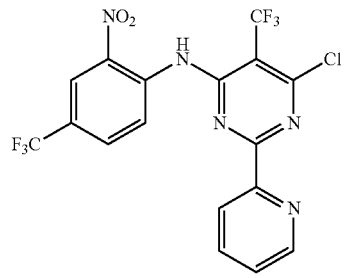 [SMILES: O=[N+]([O-])c1cc(C(F)(F)F)ccc1Nc1nc(-c2ccccn2)nc(Cl)c1C(F)(F)F]

The analysis results were as follows.
$^1$H NMR (400 MHz, CDCl$_3$) δ ppm: 11.09 (br, 1H), 9.13 (d, J=9.2 Hz, 1H), 8.88 (ddd, J=4.6, 1.8, 0.9 Hz, 1H), 8.56 (d, J=1.5 Hz, 1H), 8.39 (ddd, J=8.0, 0.9, 0.9 Hz, 1H), 7.99 (dd, J=8.9, 2.1 Hz, 1H), 7.90 (ddd, J=7.6, 7.6, 1.8 Hz, 1H), 7.50 (ddd, J=7.6, 4.6, 1.2 Hz, 1H)
APCI-MS (m/z): 465.2 [M+H]$^+$ Example 42

Production of 6-chloro-N-(2,4-dinitrophenyl)-2-(2-pyridyl)-5-(trifluoromethyl)-4-pyrimidinamine In 1.1 ml of acetonitrile, 0.1 g (0.4 mmol) of 4,6-dichloro-2-(2-pyridyl)-5-trifluoromethylpyrimidine was dissolved, and 0.08 g (0.4 mmol) of 2,4-dinitroaniline and 0.08 g (0.8 mmol) of triethylamine were added thereto. The mixture was stirred with heating under reflux for 16.1 hours. After air-cooling to room temperature, water was added to the reaction solution. The mixture was subjected to extraction with ethyl acetate, and the organic phase was dried over sodium sulfate. The dried organic phase was filtered, and the filtrate was concentrated and subjected to column purification to obtain 0.03 g of a crude product of 6-chloro-N-(2,4-dinitrophenyl)-2-(2-pyridyl)-5-(trifluoromethyl)-4-pyrimidinamine having the following structure.

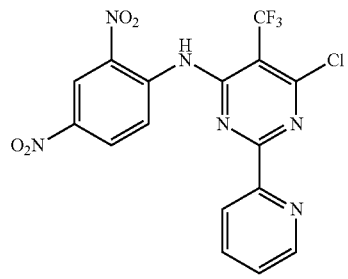 [SMILES: O=[N+]([O-])c1ccc(Nc2nc(-c3ccccn3)nc(Cl)c2C(F)(F)F)c([N+](=O)[O-])c1]

The analysis results were as follows.
APCI-MS (m/z): 441.9 [M+H]$^+$

Example 43

Production of 6-chloro-N-[5-chloro-2-nitro-4-(trifluoromethyl)phenyl]-2-(2-pyridyl)-5-(trifluoromethyl)-4-pyrimidinamine In 1.1 ml of acetonitrile, 0.1 g (0.3 mmol) of 4,6-dichloro-2-(2-pyridyl)-5-trifluoromethylpyrimidine was dissolved, and 0.1 g (0.4 mmol) of 5-chloro-2-nitro-4-(trifluoromethyl)aniline and 0.03 g (0.9 mmol) of sodium hydride were added thereto. The mixture was stirred at room temperature for 22.6 hours. Water was added to the reaction solution. The mixture was subjected to extraction with ethyl acetate, and the organic phase was dried over sodium sulfate. The dried organic phase was filtered, and the filtrate was concentrated and then subjected to column purification to obtain 0.1 g (0.2 mmol) of 6-chloro-N-[5-chloro-2-nitro-4-(trifluoromethyl)phenyl]-2-(2-pyridyl)-5-(trifluoromethyl)-4-pyrimidinamine having the following structure. The yield was 57.9%.

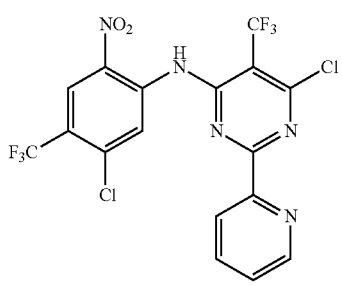 [SMILES: O=[N+]([O-])c1cc(C(F)(F)F)c(Cl)cc1Nc1nc(-c2ccccn2)nc(Cl)c1C(F)(F)F]

The analysis results were as follows.
$^1$H NMR (400 MHz, CDCl$_3$) δ ppm: 11.32 (br, 1H), 9.65 (s, 1H), 8.91 (ddd, J=4.6, 1.8, 0.9 Hz, 1H), 8.65 (s, 1H), 8.46 (ddd, J=8.0, 0.9, 0.9 Hz, 1H), 7.93 (ddd, J=8.0, 7.6, 1.8 Hz, 1H), 7.52 (ddd, J=7.3, 4.6, 0.9 Hz, 1H)
APCI-MS (m/z): 499.0 [M+H]$^+$ Example 44

Production of 6-chloro-N-(2,4-dimethylphenyl)-2-(2-pyridyl)-5-(trifluoromethyl)-4-pyrimidinamine In 1.1 ml of acetonitrile, 0.1 g (0.4 mmol) of 4,6-dichloro-2-(2-pyridyl)-5-trifluoromethylpyrimidine was dissolved, and 0.05 g (0.4 mmol) of 2,4-dimethylaniline and 0.08 g (0.8 mmol) of triethylamine were added thereto. The mixture was stirred at room temperature for 16.5 hours. Water was added to the reaction solution. The mixture was subjected to extraction with ethyl acetate, and the organic phase was dried over sodium sulfate. The dried organic phase was filtered, and the filtrate was concentrated and then subjected to column purification to obtain 0.08 g (0.2 mmol) of 6-chloro-N-(2,4-dimethylphenyl)-2-(2-pyridyl)-5-(trifluoromethyl)-4-pyrimidinamine having the following structure. The yield was 57.1%.

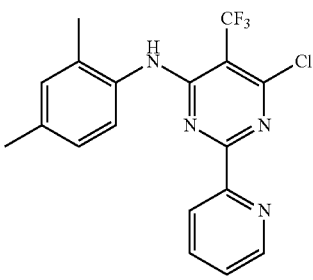 [SMILES: Cc1ccc(Nc2nc(-c3ccccn3)nc(Cl)c2C(F)(F)F)c(C)c1]

The analysis results were as follows.
$^1$H NMR (400 MHz, CDCl$_3$) δ ppm: 8.82 (ddd, J=4.6, 1.8, 0.9 Hz, 1H), 8.07 (ddd, J=8.0, 1.2, 0.9 Hz, 1H), 7.74 (ddd, J=8.0, 7.6, 1.8 Hz, 1H), 7.48 (d, J=8.0 Hz, 1H), 7.38 (ddd, J=7.6, 4.6, 1.2 Hz, 1H), 7.32 (br, 1H), 7.09-7.13 (m, 2H), 2.38 (s, 3H), 2.23 (s, 3H)
APCI-MS (m/z): 380.0 [M+H]$^+$ Example 45

Production of 6-chloro-N-(4-chlorophenyl)-2-(2-pyridyl)-5-(trifluoromethyl)-4-pyrimidinamine In 1.1 ml of acetonitrile, 0.1 g (1.3 mmol) of 4,6-dichloro-2-(2-pyridyl)-5-trifluoromethylpyrimidine was dissolved, and 0.07 g (0.5 mmol) of 4-chloroaniline and 0.08 g (0.8 mmol) of triethylamine was added thereto. The mixture was stirred at room temperature for 17.5 hours. Water was added to the reaction solution. The mixture was subjected to extraction with ethyl acetate, and the organic phase was dried over sodium sulfate. The dried organic phase was filtered, and the filtrate was concentrated and subjected to column purification to obtain 0.1 g (0.3 mmol) of 6-chloro-N-(4-chlorophenyl)-2-(2-pyridyl)-5-(trifluoromethyl)-4-pyrimidinamine having the following structure. The yield was 88.9%.

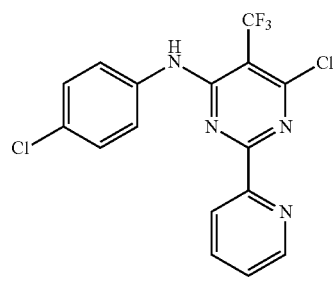 [SMILES: FC(F)(F)c1c(Cl)nc(-c2ccccn2)nc1Nc1ccc(Cl)cc1]

The analysis results were as follows.
$^1$H NMR (400 MHz, CDCl$_3$) δ ppm: 8.86 (ddd, J=4.6, 1.8, 0.9 Hz, 1H), 8.24 (ddd, J=8.0, 0.9, 0.9 Hz, 1H), 7.83 (ddd, J=8.0, 7.6, 1.8 Hz, 1H), 7.50-7.57 (m, 3H), 7.40-7.46 (m, 3H)
APCI-MS (m/z): 385.9 [M+H]$^+$ Example 46

Production of 6-chloro-N-(2,4-dichlorophenyl)-2-(2-pyridyl)-5-(trifluoromethyl)-4-pyrimidinamine In 1.1 ml of acetonitrile, 0.1 g (0.3 mmol) of 4,6-dichloro-2-(2-pyridyl)-5-trifluoromethylpyrimidine was dissolved, and 0.07 g (0.4 mmol) of 2,4-dichloroaniline and 0.03 g (0.7 mmol) of sodium hydride were added thereto. The mixture was stirred at room temperature for 21.9 hours. Water was added to the reaction solution. The mixture was subjected to extraction with ethyl acetate, and the organic phase was dried over sodium sulfate. The dried organic phase was filtered, and the filtrate was concentrated and then subjected to column purification to obtain 0.01 g of a crude product of 6-chloro-N-(2,4-dichlorophenyl)-2-(2-pyridyl)-5-(trifluoromethyl)-4-pyrimidinamine having the following structure.

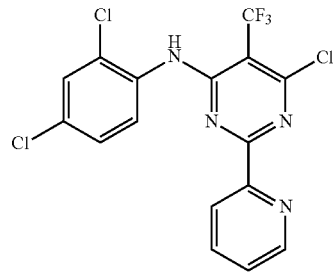 [SMILES: FC(F)(F)c1c(Cl)nc(-c2ccccn2)nc1Nc1ccc(Cl)cc1Cl]

The analysis results were as follows.
$^1$H NMR (400 MHz, CDCl$_3$) δ ppm: 8.86 (ddd, J=4.6, 1.8, 0.9 Hz, 1H), 8.39 (d, J=8.9 Hz, 1H), 8.28 (ddd, J=8.0, 1.2, 0.9 Hz, 1H), 8.06 (br, 1H), 7.85 (ddd, J=8.0, 7.6, 1.8 Hz, 1H), 7.50 (d, J=2.5 Hz, 1H), 7.45 (d, J=7.6, 4.9, 1.2 Hz, 1H), 7.39 (dd, J=8.9, 2.5 Hz, 1H)

APCI-MS (m/z): 420.0 [M]+

Example 47

Production of 6-chloro-N-(4-chloro-2-methylphenyl)-2-(2-pyridyl)-5-(trifluoromethyl)-4-pyrimidinamine In 1.1 ml of acetonitrile, 0.1 g (0.3 mmol) of 4,6-dichloro-2-(2-pyridyl)-5-trifluoromethylpyrimidine was dissolved, and 0.07 g (0.5 mmol) of 4-chloro-2-methylaniline and 0.07 g (0.5 mmol) of triethylamine were added thereto. The mixture was stirred at room temperature for 21.6 hours. Water was added to the reaction solution. The mixture was subjected to extraction with ethyl acetate, and the organic phase was dried over sodium sulfate. The dried organic phase was filtered, and the filtrate was concentrated and subjected to column purification to obtain 0.04 g of a crude product of 6-chloro-N-(4-chloro-2-methylphenyl)-2-(2-pyridyl)-5-(trifluoromethyl)-4-pyrimidinamine having the following structure.

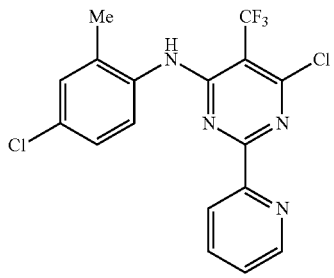 [SMILES: Cc1cc(Cl)ccc1Nc1nc(-c2ccccn2)nc(Cl)c1C(F)(F)F]

The analysis results were as follows.
$^{19}$F NMR (400 MHz, CDCl$_3$) δ ppm: −56.11 (s, 3F)
APCI-MS (m/z): 400.1 [M+H]+

Example 48

Production of N-(4-chloro-2-methylphenyl)-6-methoxy-2-(2-pyridyl)-5-(trifluoromethyl)-4-pyrimidinamine In 1.1 ml of acetonitrile, 0.1 g (0.4 mmol) of 4-fluoro-6-methoxy-2-(2-pyridyl)-5-trifluoromethylpyrimidine was dissolved, and 0.07 g (0.5 mmol) of 4-chloro-2-methylaniline and 0.1 g (0.9 mmol) of triethylamine were added thereto. the mixture was stirred with heating under reflux for 22.2 hours. Water was added to the reaction solution. The mixture was extracted with ethyl acetate, and the organic phase was dried over sodium sulfate. The dried organic phase was filtered, and the filtrate was concentrated and then subjected to column purification to obtain 0.01 g (0.02 mmol) of N-(4-chloro-2-methylphenyl)-6-methoxy-2-(2-pyridyl)-5-(trifluoromethyl)-4-pyrimidinamine having the following structure. The yield was 5.7%.

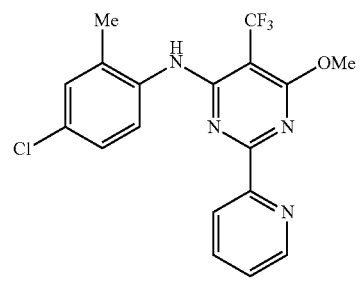 [SMILES: COc1nc(-c2ccccn2)nc(Nc2ccc(Cl)cc2C)c1C(F)(F)F]

The analysis results were as follows.
$^1$H NMR (400 MHz, CDCl$_3$) δ ppm: 8.80 (ddd, J=4.6, 1.8, 0.9 Hz, 1H), 8.16 (ddd, J=8.0, 1.2, 0.9 Hz, 1H), 7.76-7.80 (m, 2H), 7.38 (ddd, J=7.6, 4.9, 1.2 Hz, 1H), 7.24-7.28 (m, 2H), 7.15 (br, 1H), 4.22 (s, 3H), 2.27 (s, 3H)
APCI-MS (m/z): 396.1 [M+H]+

(Evaluation Test for Powdery Mildew of Cucumbers (500 ppm))

A fluorine-containing pyrimidine compound prepared in Examples 12, 13 or 15 was dissolved in acetone and diluted to a concentration of 500 ppm. Subsequently, a cucumber leaf disc (diameter 20 mm) was placed in a diluted acetone solution and completely wetted. The cucumber leaf disc was then placed so that the back surface of the cucumber leaf disc contacted a separately prepared plain agar medium, and air-dried. After air-drying, a cucumber powdery mildew spore suspension was evenly sprayed on the cucumber leaf disc and air-dried. The cucumber leaf disc was then allowed to stand in an incubator (25° C., illuminated for 12 hours), and after 12 days, the blotch area was examined to calculate the control value. The results are shown in Table 1. The control value was calculated according to the following formula. In the following formula, "untreated" means that the cucumber leaf disc was wetted with only acetone as the test solution, and "untreated section" represents the corresponding section.

TABLE 1

| Test compound | Control value |
| --- | --- |
| Example 12 | 100.0 |
| Example 13 | 98.8 |
| Example 15 | 100.0 |

(Evaluation Test for Cucumber Powdery Mildew (100 ppm))

A fluorine-containing pyrimidine compound prepared in Examples 12, 13 or 15 was dissolved in acetone and diluted to a concentration of 100 ppm. Subsequently, a cucumber leaf disc (diameter 20 mm) was placed in a diluted acetone solution and completely wetted. The cucumber leaf disc was placed so that the back surface of the cucumber leaf disc contacted a separately prepared plain agar medium, and air-dried. After air-drying, a cucumber powdery mildew spore suspension was evenly prayed on the cucumber leaf disc and air-dried. The cucumber leaf disc was then allowed to stand in an incubator (25° C., illuminated for 12 hours), and after 12 days, the blotch area was examined to calculate the control value. The results are shown in Table 2. The control value was calculated according to the following formula. In the following formula, "untreated" means that the cucumber leaf disc was wetted with only acetone as the test solution, and "untreated section" represents the corresponding section.

TABLE 2

| Test compound | Control value |
| --- | --- |
| Example 12 | 91.8 |
| Example 13 | 80.0 |
| Example 15 | 100.0 |

Control value = {(Average diseased area in untreated section − Average diseased area in treated section)/Average diseased area in untreated section} × 100

(Evaluation Test for Gray Mold (500 ppm))

The fluorine-containing pyrimidine compound prepared in Example 1, 2, 3, 4, 12 or 16 was dissolved in DMSO and diluted to a concentration of 50000 ppm. To 3 ml of a dissolved PDA medium, 30 μL of diluted DMSO solution each was added and stirred with a pipette. The mixture was placed in a well of a 6-well plate and allowed to solidify (final concentration: 500 ppm, repeated 3 times each). Gray mold germs (*Botrytis cinerea*, strain 2018105) grown in a PDA medium was cut out together with the medium with a biopsy punch having a diameter of 0.4 cm, and placed on the center of the PDA medium in the 6-well plate containing the DMSO solution so as to be grown at 27° C. After two days, the diameters of mycelia were measured and the control value was calculated. The average is shown in Table 3. The control value was calculated according to the following formula. In the formula described below, "untreated" represents PDA medium to which only DMSO was added as the test solution.

TABLE 3

| Test compound | Control value |
| --- | --- |
| Example 1 | 90.5 |
| Example 2 | 86.8 |
| Example 3 | 76.9 |
| Example 4 | 86.8 |
| Example 12 | 94.3 |
| Example 16 | 92.4 |

Control value = {(Diameter of untreated mycelia − Diameter of treated mycelia)/Diameter of untreated mycelia} × 100

From the above, it can be seen that the fluorine-containing pyrimidine compound of the present disclosure exhibits a sterilizing effect against germs of cucumber powdery mildew and gray mold, and is effective as a compound exhibiting biological activity, particularly as a harmful fungus control agent.

The invention claimed is:

1. A fluorine-containing pyrimidine compound represented by the following formula (1), (2) or (3):

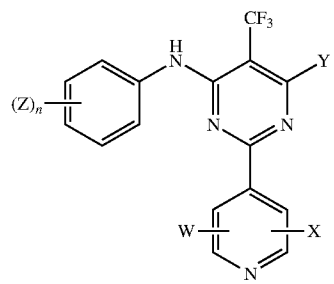

(1)

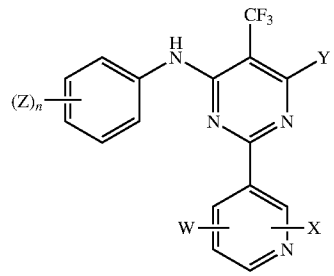

(2)

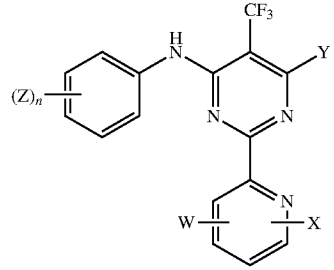

(3)

wherein in the above formulas (1) to (3), W and X each independently represent a hydrogen atom, a halogen atom, a hydrocarbon group having 1 to 10 carbon atoms, $-C_mF_{2m+1}$ (m is an integer of 1 to 10), a nitro group, $-OA^1$, $-SO_lA^1$ (l is an integer from 1 to 3), $-SA^1$, $-NA^1A^2$, $-B(OA^1)(OA^2)$, $-COA^1$, $-COOA^1$ or $-CONA^1A^2$;

Y represents a halogen atom or $-OA^3$;

Z represents a halogen atom, a hydrocarbon group having 1 to 10 carbon atoms, $-C_mF_{2m+1}$ (m is an integer of 1 to 10), a nitro group, $-OA^1$, $-SO_lA^1$ (l is an integer of 1 to 3), $-SA^1$ or $-NA^1A^2$;

$A^1$ and $A^2$ each independently represent a hydrogen atom or a hydrocarbon group having 1 to 10 carbon atoms;

$A^3$ represents a hydrocarbon group having 1 to 12 carbon atoms;

n represents an integer of 0 to 3;

$A^1$, $A^2$, m and l each may be the same or different in W, X and Z; and when a plurality of Z is present, they may be the same or different.

2. A harmful fungus control agent comprising:
the fluorine-containing pyrimidine compound according to claim 1 or a salt thereof as active ingredient.

3. A method for producing a fluorine-containing pyrimidine compound represented by the formula (1), (2), or (3), comprising:

(a) reacting a compound represented by the following general formula (4) with a fluorine-containing pyrimidine compound represented by the following formula (5) to obtain a fluorine-containing pyrimidine compound represented by the following formula (1):

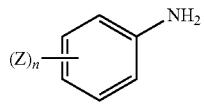
(4)

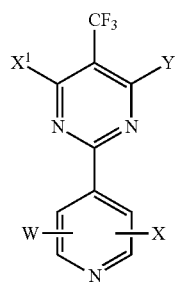
(5)

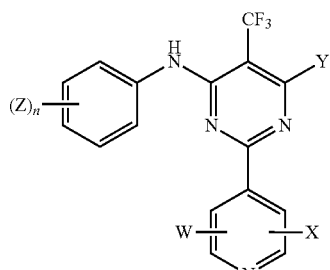
(1)

(b) reacting a compound represented by the following formula (4) with a fluorine-containing pyrimidine compound represented by the following formula (6) to obtain a fluorine-containing pyrimidine compound represented by the following formula (2):

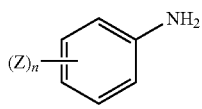
(4)

(6)

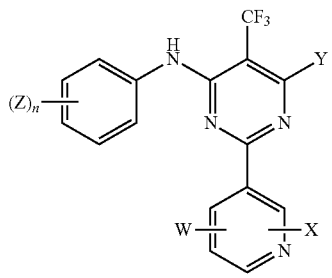
(2)

or (c) reacting a compound represented by the following formula (4) with a fluorine-containing pyrimidine compound represented by the following general formula (7) to obtain a fluorine-containing pyrimidine compound represented by the following formula (3):

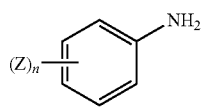
(4)

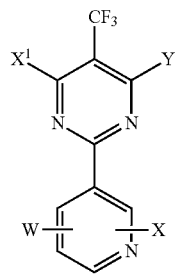
(7)

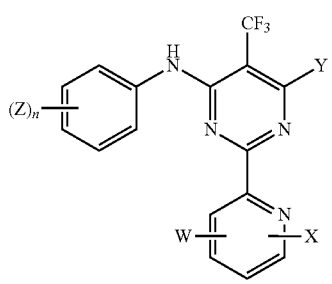
(3)

wherein in the above formulas (1) to (7), W and X each independently represent a hydrogen atom, a halogen atom, a hydrocarbon group having 1 to 10 carbon atoms, —$C_mF_{2m+1}$ (m is an integer of 1 to 10), a nitro group, —$OA^1$, —$SO_lA^1$ (l is an integer from 1 to 3), —$SA^1$, —$NA^1A^2$, —$B(OA^1)(OA^2)$, —$COA^1$, —$COOA^1$ or —$CONA^1A^2$;

$X^1$ represents a halogen atom;

Y represents a halogen atom or —$OA^3$;

Z represents a halogen atom, a hydrocarbon group having 1 to 10 carbon atoms, —$C_mF_{2m+1}$ (m is an integer of 1 to 10), a nitro group, —$OA^1$, —$SO_lA^1$ (l is an integer of 1 to 3), —$SA^1$ or -$NA^1A^2$;

$A^1$ and $A^2$ each independently represent a hydrogen atom or a hydrocarbon group having 1 to 10 carbon atoms;

$A^3$ represents a hydrocarbon group having 1 to 12 carbon atoms;

n represents an integer of 0 to 3;

$A^1$, $A^2$, m and 1 each may be the same or different in W, X and Z; and when a plurality of Z is present, they may be the same or different.

4. A method for producing a fluorine-containing pyrimidine compound represented by the formula (1), (2), or (3), comprising:

(d) reacting a compound represented by the following formula (8) with a fluorine-containing pyrimidine compound represented by the following general formula (9) to obtain a fluorine-containing pyrimidine compound represented by the following formula (1):

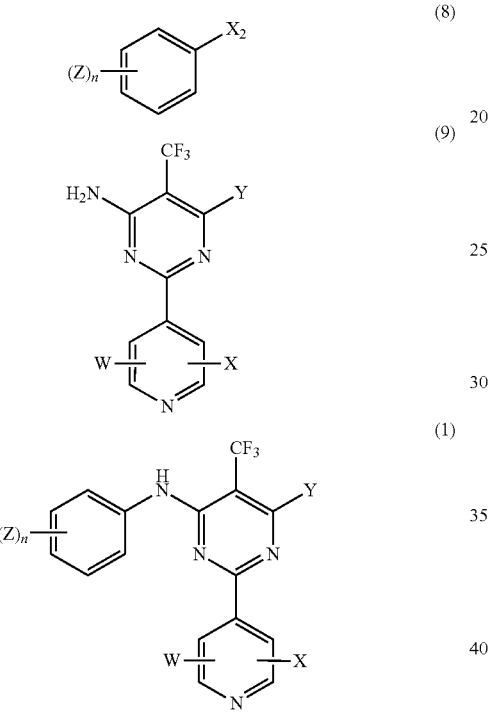

(e) reacting a compound represented by the following formula (8) with a fluorine-containing pyrimidine compound represented by the following general formula (10) to obtain a fluorine-containing pyrimidine compound represented by the following formula (2):

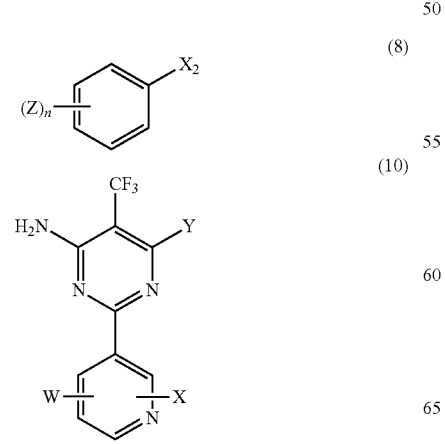

or (f) reacting a compound represented by the following formula (8) with a fluorine-containing pyrimidine compound represented by the following formula (11) to obtain a fluorine-containing pyrimidine compound represented by the following formula (3):

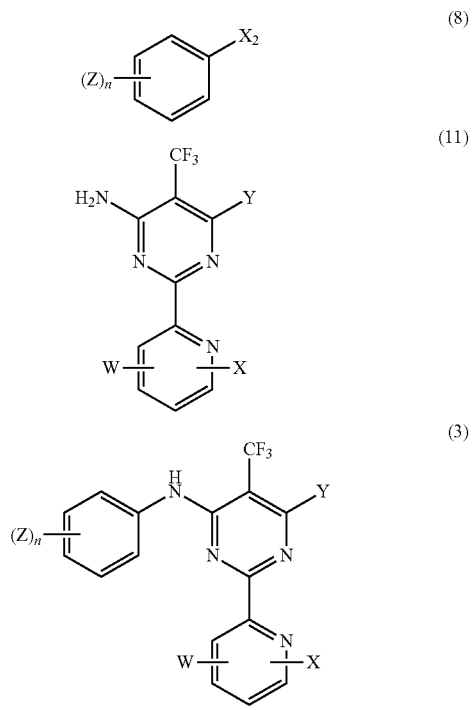

wherein in the above formulas (1) to (3) and (8) to (11),

W and X each independently represent a hydrogen atom, a halogen atom, a hydrocarbon group having 1 to 10 carbon atoms, —$C_mF_{2m+1}$ (m is an integer of 1 to 10), a nitro group, —$OA^1$, —$SO_lA^1$ (l is an integer from 1 to 3), —$SA^1$, —$NA^1A^2$, —$B(OA^1)(OA^2)$, —$COA^1$, —$COOA^1$ or —$CONA^1A^2$;

$X^2$ represents a halogen atom;

Y represents a halogen atom or —$OA^3$;

Z represents a halogen atom, a hydrocarbon group having 1 to 10 carbon atoms, —$C_mF_{2m+1}$ (m is an integer of 1 to 10), a nitro group, —$OA^1$, —$SO_lA^1$ (l is an integer of 1 to 3), —$SA^1$ or -$NA^1A^2$;

$A^1$ and $A^2$ each independently represent a hydrogen atom or a hydrocarbon group having 1 to 10 carbon atoms;

$A^3$ represents a hydrocarbon group having 1 to 12 carbon atoms;

n represents an integer of 0 to 3;

$A^1$, $A^2$, m and l each may be the same or different in W, X and Z; and when a plurality of Z is present, they may be the same or different.

* * * * *